US010250765B2

(12) United States Patent
Shibata et al.

(10) Patent No.: US 10,250,765 B2
(45) Date of Patent: Apr. 2, 2019

(54) IMAGE FORMING APPARATUS, IMAGE FORMING SYSTEM, AND IMAGE FORMING METHOD

(71) Applicants: Yuto Shibata, Kanagawa (JP); Tsuyoshi Endoh, Kanagawa (JP)

(72) Inventors: Yuto Shibata, Kanagawa (JP); Tsuyoshi Endoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/030,429

(22) Filed: Jul. 9, 2018

(65) Prior Publication Data

US 2018/0324313 A1 Nov. 8, 2018

Related U.S. Application Data

(63) Continuation of application No. 15/452,283, filed on Mar. 7, 2017, now Pat. No. 10,044,886.

(30) Foreign Application Priority Data

Mar. 18, 2016 (JP) .................................. 2016-054662
Dec. 19, 2016 (JP) .................................. 2016-245102

(51) Int. Cl.
*G06F 3/12* (2006.01)
*H04N 1/00* (2006.01)

(52) U.S. Cl.
CPC ..... *H04N 1/00482* (2013.01); *H04N 1/00413* (2013.01); *H04N 1/00474* (2013.01); *H04N 2201/0094* (2013.01)

(58) Field of Classification Search
CPC .......... H04N 1/00482; H04N 1/00474; H04N 1/00413; H04N 1/00408; H04N 2201/0094

See application file for complete search history.

(56) References Cited

U.S. PATENT DOCUMENTS

2005/0108654 A1* 5/2005 Gopalraj ................. G06F 21/31
715/791
2008/0201303 A1* 8/2008 Bragiel ............. G06F 17/30646

(Continued)

FOREIGN PATENT DOCUMENTS

JP 2009-289022 12/2009

*Primary Examiner* — Moustapha Diaby
(74) *Attorney, Agent, or Firm* — Oblon, McClelland, Maier & Neustadt, L.L.P.

(57) ABSTRACT

An image forming apparatus includes a display and circuitry that controls the display to display multiple display components corresponding to multiple setting items, accepts a setting value for a first setting item through corresponding one of the multiple display components, based on a determination indicating a first setting item is one of a preregistered combination of setting items to be configured en bloc, modifies setting values for respective ones of the preregistered combination of setting items based on the accepted setting value for the first setting item, determines whether any one of the multiple display components corresponding to the modified setting values for the preregistered combination of setting items is configured as non-displayed, and based on a determination indicating any one of the multiple display components corresponding to the modified setting values is configured as non-displayed, outputs a notification indicating the setting value for the non-displayed setting item is modified.

18 Claims, 23 Drawing Sheets

(56) References Cited

U.S. PATENT DOCUMENTS

| | | | |
|---|---|---|---|
| 2008/0307329 A1* | 12/2008 | Endoh | G03G 15/5016 715/762 |
| 2009/0235173 A1* | 9/2009 | Ichihara | H04N 1/00222 715/733 |
| 2009/0300529 A1 | 12/2009 | Endoh et al. | |
| 2010/0271661 A1* | 10/2010 | Ogino | G06F 3/1205 358/1.15 |
| 2011/0161881 A1* | 6/2011 | Tomita | H04N 1/00408 715/825 |
| 2012/0033251 A1 | 2/2012 | Okada et al. | |
| 2012/0147404 A1 | 6/2012 | Kubota et al. | |
| 2013/0057916 A1 | 3/2013 | Kubota et al. | |
| 2013/0088737 A1 | 4/2013 | Iwasa et al. | |
| 2015/0073935 A1 | 3/2015 | Shibata et al. | |
| 2016/0072977 A1 | 3/2016 | Sasayama et al. | |
| 2016/0150123 A1 | 5/2016 | Okada et al. | |
| 2016/0155093 A1 | 6/2016 | Shibata et al. | |

* cited by examiner

FIG. 5A

LAYOUT SETTING INFORMATION MANAGEMENT TABLE 500

| KEY ID | SETTING ITEM | ROW NUMBER | ORDER OF LAYOUT | DISPLAY SETTING |
|---|---|---|---|---|
| K001 | COLOR | 1 | 1 | DISPLAYED |
| K002 | REDUCE/ENLARGE | 1 | 2 | DISPLAYED |
| K003 | NUMBER OF COPIES | 1 | 3 | DISPLAYED |
| K004 | DENSITY | 2 | 1 | DISPLAYED |
| K005 | TRAY | 2 | 2 | DISPLAYED |
| K006 | STAPLE | 2 | 3 | DISPLAYED |
| K007 | PUNCH | 3 | 1 | DISPLAYED |
| K008 | SORT | 3 | 2 | DISPLAYED |
| K009 | DUPLEX | 3 | 3 | DISPLAYED |
| K010 | COMBINE | 4 | 1 | DISPLAYED |
| K011 | SPLIT | 4 | 2 | DISPLAYED |
| K012 | BOOK | 4 | 3 | DISPLAYED |

FIG. 5B

LINKAGE SETTING MANAGEMENT TABLE 600

| SETTING ITEM | LINKAGE SETTING ITEM |
|---|---|
| STAPLE | SORT |
| COMBINE | SORT |
| ... | ... |

FIG. 11

PRESET PROGRAM MANAGEMENT TABLE 700

| PROGRAM ID | PROGRAM NAME | CONFIGURED CONTENT (CONFIGURED ITEM : SETTING VALUE) |
|---|---|---|
| P0001 | PROGRAM 1 | COLOR : FULL COLOR, STAPLE : UPPER RIGHT, ⋯ |
| P0002 | PROGRAM 2 | COLOR : MONOCHROME, COMBINE : 4 in 1, ⋯ |
| P0003 | PROGRAM 3 | COLOR : TWO-TONE, PUNCH : 2 LEFT, ⋯ |
| ⋯ | ⋯ | ⋯ |

701  702  703 ical Field

IMAGE FORMING APPARATUS, IMAGE FORMING SYSTEM, AND IMAGE FORMING METHOD

CROSS-REFERENCE TO RELATED APPLICATION

This patent application is a continuation application of U.S. application Ser. No. 15/452,283, filed Mar. 7, 2017, and is based on and claims priority pursuant to 35 U.S.C. § 119(a) to Japanese Patent Applications No. 2016-054662, filed on Mar. 18, 2016 and No. 2016-245102, filed on Dec. 19, 2016 in the Japan Patent Office. The entire contents of the above-identified applications are incorporated herein by reference.

BACKGROUND

Technical Field

The present invention relates to an image forming apparatus, an image forming system, and an image forming method.

Background Art

With the increase in functions of image forming apparatuses, the number of setting items for one function (e.g., copying function) has been increasing.

In order to simplify cumbersome configuration procedures to configure the setting items, a preset program function may be used, which calls preregistered contents for the setting items and configures at once (called "en block configuration"). Regarding combinations of items that are required to configure simultaneously to make predetermined functions operate (e.g., staple and sort), a linkage configuration function is known, which modifies one setting automatically in accordance with modification of the other setting.

Further, a technology that deactivates keys for configuring settings of functions displayed on a control panel is known. In this case, if settings corresponding to the deactivated keys are automatically modified by the en block configuration or the linkage configuration, it is impossible to confirm the modification on the control panel by user operation.

SUMMARY

Example embodiments of the present invention provide a novel image forming apparatus that includes a display and circuitry that controls the display to display, in a predetermined display format, multiple display components corresponding to multiple setting items, the multiple setting items relating to one of a plurality of functions implemented in the image forming apparatus, the predetermined display format causing the display not to display at least a part of the multiple display components when the part of the multiple display components is configured as non-displayed, accepts a setting value for a first setting item of the multiple setting items through corresponding one of the multiple display components, based on a determination indicating that a first setting item is one of a preregistered combination of setting items to be configured en bloc, modifies setting values for respective ones of the preregistered combination of setting items based on the accepted setting value for the first setting item, determines whether any one of the multiple display components corresponding to the modified setting values for the preregistered combination of setting items is configured as non-displayed, and based on a determination indicating that any one of the multiple display components corresponding to the modified setting values is configured as non-displayed, outputs a notification indicating that the setting value for the non-displayed setting item is modified.

Further example embodiments of the present invention provide an image forming system and a method of forming an image.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIGS. 5A and 5B are diagrams illustrating a layout setting information management table etc. as an embodiment of the present invention;

FIG. 11 is a diagram illustrating a preset program management table as an embodiment of the present invention;

Figure 1:
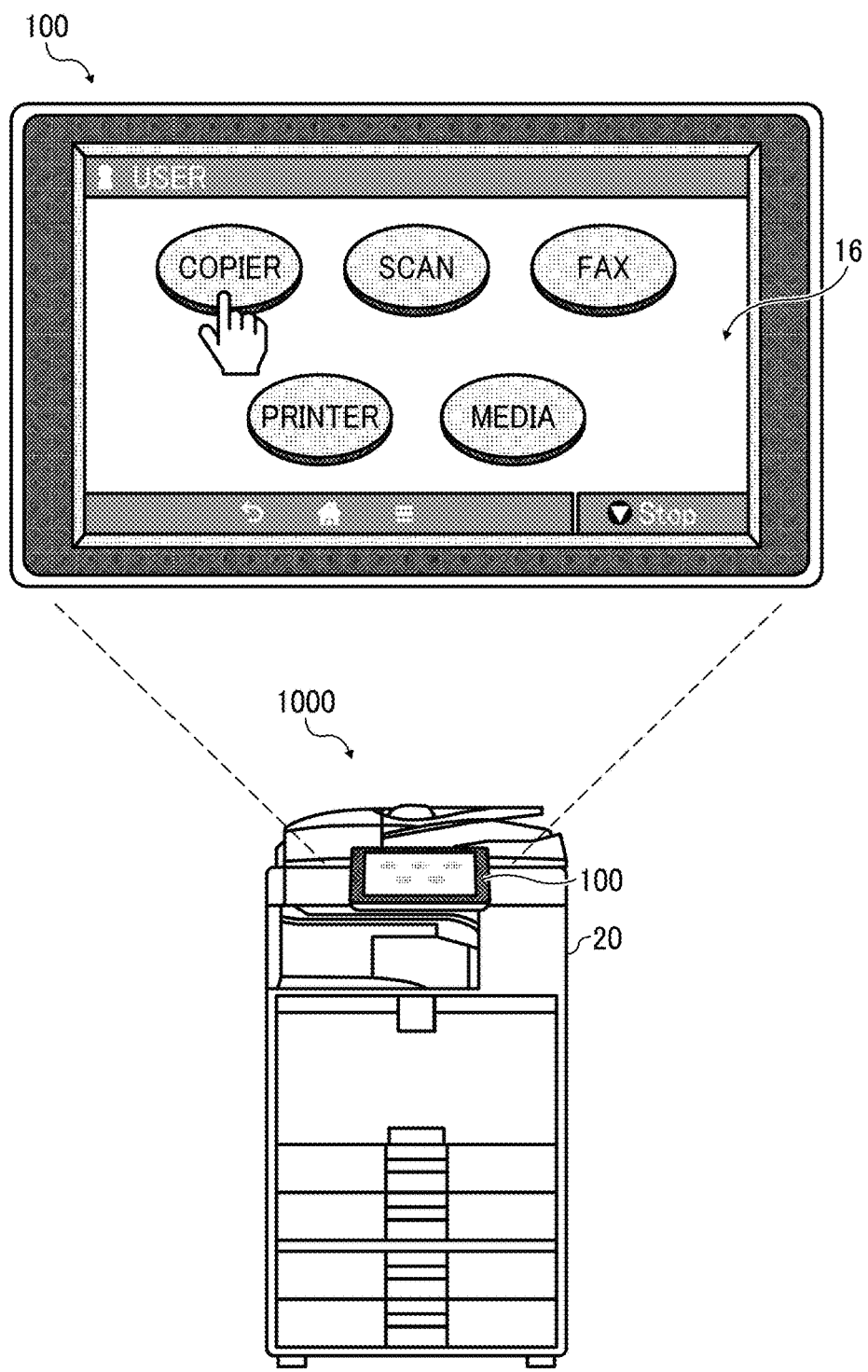
FIG. 1 is a diagram illustrating an outer appearance of an image forming system as an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A more complete appreciation of the disclosure and many of the attendant advantages thereof will be readily obtained as the same becomes better understood by reference to the following detailed description when considered in conjunction with the accompanying drawings.

FIG. 1 is a diagram illustrating an external view of an image forming system 1000 in this embodiment. As illustrated in FIG. 1, in the image forming system 1000 in this embodiment, an image forming apparatus 20 and an operation apparatus 100 are included, and the image forming apparatus 20 and the operation apparatus 100 are communicably connected with each other via any desired communication method.

Here, for example, the image forming apparatus 20 is a multifunction peripheral (MFP) including image processing functions such as a copy function, scan function, facsimile function, and print function etc. The image forming apparatus 20 is also referred to as the MFP 20 hereinafter.

The operation apparatus 100 is a computer apparatus that accepts various operations such as an operation of selecting a function included in the image forming apparatus 20 described above, an operation of inputting setting values of various setting items regarding each function, and an operation of inputting a command to execute to start performing each function. As illustrated in a close-up diagram in FIG. 1, the operation apparatus 100 in this embodiment includes a large-sized touch panel display 16 on the front face of the tablet-shaped case of the apparatus, and GUI parts (display parts) for accepting various operations described above and various messages such as error messages and guidance messages etc. are displayed on the touch panel display 16.

Here, the operation apparatus 100 in this embodiment includes an operating system equivalent to operation systems developed for smartphones and tablet PCs etc. and may accept various manual input operations such as tapping, double tapping, dragging, flicking, pinching out, and pinching in etc. via the touch panel display that the smartphones etc. may accept.

Figure 2:
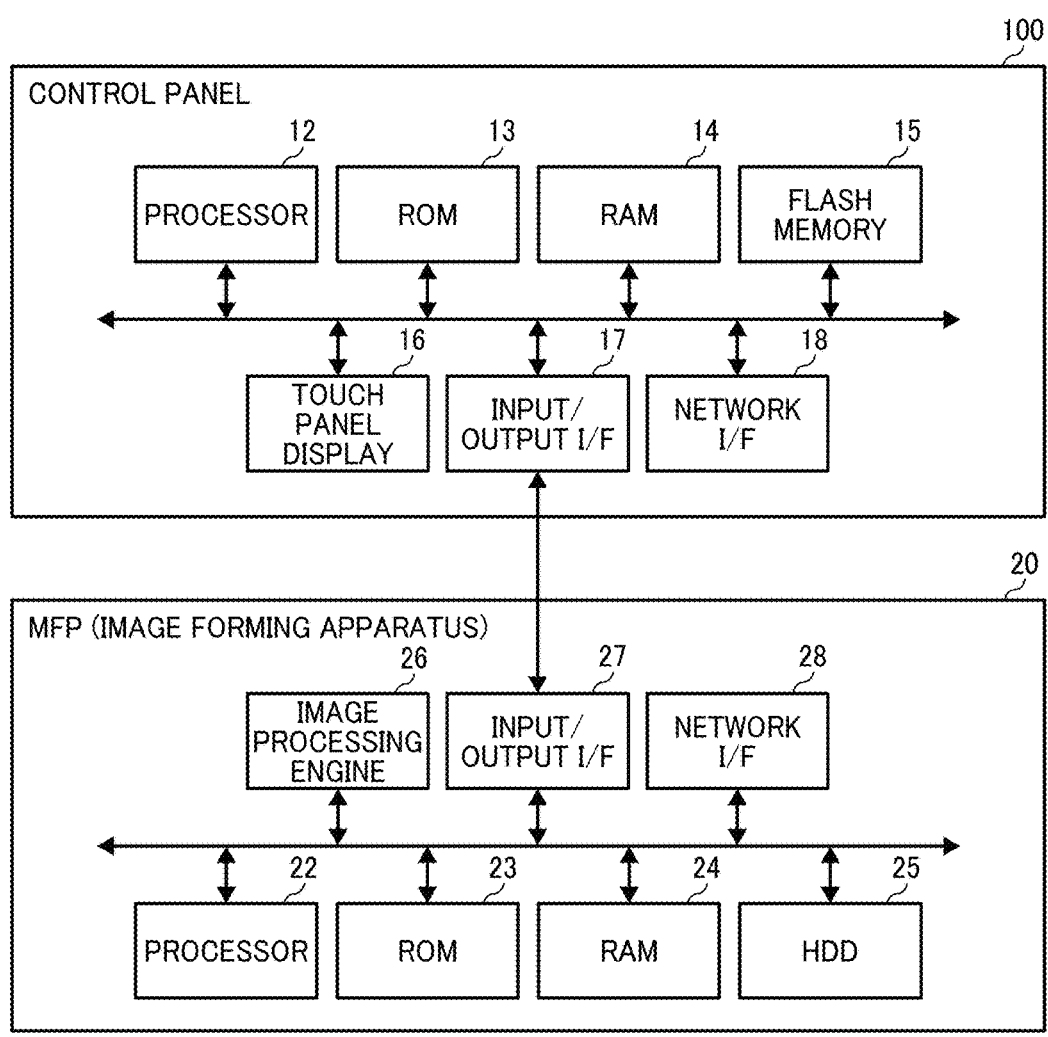
FIG. 2 is a diagram illustrating a hardware configuration of the image forming system as an embodiment of the present invention.

The operation apparatus 100 and the MFP 20 that construct the image forming system 1000 in this embodiment are described above. Subsequently, a hardware configuration of the operation apparatus 100 and the MFP 20 are described below with reference to a diagram illustrating the hardware configuration in FIG. 2.

The operation apparatus 100 includes a processor 12 that controls the entire operation apparatus 100, a read only memory (ROM) 13 that stores a boot program and a firmware program etc., a random access memory (RAM) 14 that provides a work area for executing a program, a flash memory 15 that functions as an auxiliary storage device that stores various programs executed by the processor 12 and various data, a touch panel display 16 (also referred to as display 16 in some cases hereinafter), an input/output interface (I/F) 17, and a network I/F 18 for connecting the apparatus 100 to a network compatible with a predetermined standard.

The MFP 20 in this embodiment includes a processor 22 that controls the entire MFP 20, a ROM 23 that stores a boot program and a firmware program etc., a RAM 24 that provides a work area for executing a program, a hard disk drive (HDD) 25 that functions as an auxiliary storage device that stores various program executed by the processor 22 and various data, an image processing engine 26 that performs image processing operations regarding various functions such as a copier, scanner, facsimile, and printer etc., an input/output I/F 27 to connect to an external apparatus, and a network I/F 28 for connecting the MFP 20 to a network compatible with a predetermined standard.

In this embodiment, the operation apparatus 100 is connected to the MFP 20 via a wired network via the input/output I/F 17 and the input/output I/F 27. An example of the input/output I/F for the wired connection is Universal Serial Bus (USB). It should be noted that the operation apparatus 100 may be connected to the MFP 20 via a wireless network compatible with standards such as Wi-Fi (registered trademark) and Bluetooth (registered trademark) etc.

The hardware configuration of the operation apparatus 100 and the MFP 20 is described above. A functional configuration of the operation apparatus 100 is described below with reference to a diagram illustrating functional blocks in FIG. 3.

Figure 3:
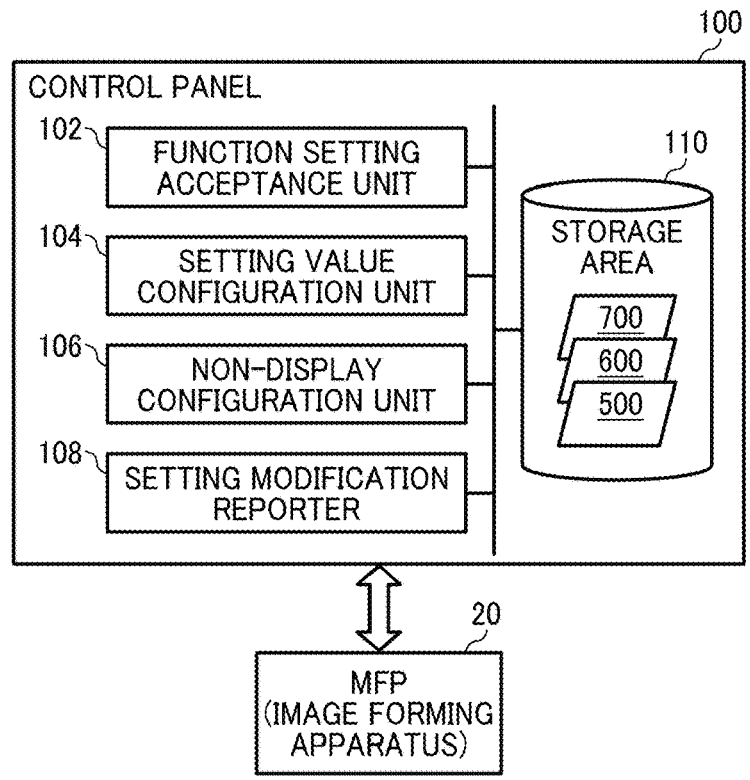
FIG. 3 is a diagram illustrating functional blocks of the operation apparatus as an embodiment of the present invention.

As illustrated in FIG. 3, the operation apparatus 100 in this embodiment includes a function setting acceptance unit 102, a setting value configuration unit 104, a non-display configuration unit 106, a setting modification reporter 108, and a storage area 110. In this embodiment, the operation apparatus 100 implements the functional units described above by executing predetermined programs stored in the ROM 13 by the processor 12 included in the operation apparatus 100. The function setting acceptance unit 102, the setting value configuration unit 104, the non-display configuration unit 106, and the setting information reporter 108 are each implemented by the processor 12 according to a control program stored in any desired memory. The storage area 110 is any desired memory such as the flash memory 15.

The function setting acceptance unit 102 displays GUI parts (display parts) corresponding to multiple setting items regarding multiple functions (e.g., copier, scanner, facsimile, and printer etc.) included in the MFP 20 on the screen of the display 16 in a predetermined displaying format and accepts various operations inputting setting values regarding setting items corresponding to each of the GUI parts (display parts).

The setting value configuration unit 104 configures setting values regarding setting items corresponding to each of the GUI parts (display parts) to the image forming apparatus 20. In response to inputting user operations, the setting value configuration unit 104 configures setting values regarding setting items to the image forming apparatus 20. Regarding a combination of setting items required to be configured simultaneously to implement a predetermined function, the setting value configuration unit 104 also modifies one setting value in accordance with modification of the other setting value en bloc automatically. For example, if a setting item "staple" is set as enabled and a setting item "sort" is set as disabled, it is impossible to implement a stapling function in units of copies. Therefore, in conjunction with the configuration that the setting item "staple" is set as enabled, automatically, the setting value configuration unit 104 sets the setting item "sort" as enabled. In the below description, regarding a combination of setting items with relationship that a function regarding one setting item may not be implemented as long as an effective value is not set to the other setting item, one setting item is referred to as "a linking setting item", and the other setting item is referred to as "a linked setting item".

In response to a request by user operation, the setting value configuration unit 104 preregisters a combination of setting values for setting items as a preset program, calls a program requested by user operation, and configures the combination of setting values for setting items described in the program en block.

The non-display configuration unit 106 configures whether or not a GUI part (display part) corresponding to a setting item is displayed on the display screen and configures, in response to a request from an administrator, a specified GUI part (display part) as a non-displayed status.

When a setting value for a setting item corresponding to a GUI part (display part) configured as non-displayed is modified, the setting modification reporter 108 reports that the setting value is modified.

In reporting that two or more setting values are modified, the setting modification reporter 108 may accept an operation that releases modification of all setting values. In addition, if a preset program that includes a setting item related to a linkage setting is configured and both a GUI part (display part) corresponding to a linking setting item and a GUI part (display part) corresponding to a linked setting item are configured as non-displayed, the setting modification reporter 108 does not accept releasing modification of a setting value for the linked setting item without releasing modification of a setting value for the linking setting item. In addition, the setting modification reporter 108 may report that it is impossible to accept releasing modification of the setting value corresponding to the linked setting item without releasing modification of the setting value corresponding to the linking setting item. In reporting that it is impossible to accept releasing modification of the setting value corresponding to the linked setting item without releasing modification of the setting value corresponding to the linking setting item, the setting modification report 108 may accept an operation that releases both the setting value corresponding to the linking setting item and the setting value corresponding to the linked setting item en bloc.

The storage area 110 stores various information such as a layout setting information management table 500, a linkage setting management table 600, and a preset program management table 700 etc. It should be noted that each of the tables is described in detail later.

The functional configuration of the operation apparatus 100 is described above. Next, specific operations executed by the functional units described above referring to FIG. 3 are described below. In the below description, the GUI part (display part) described before is referred to as "key" in some cases, and a format displaying the multiple GUI parts (display parts) described above is referred to as "layout" in some cases.

Figure 4:
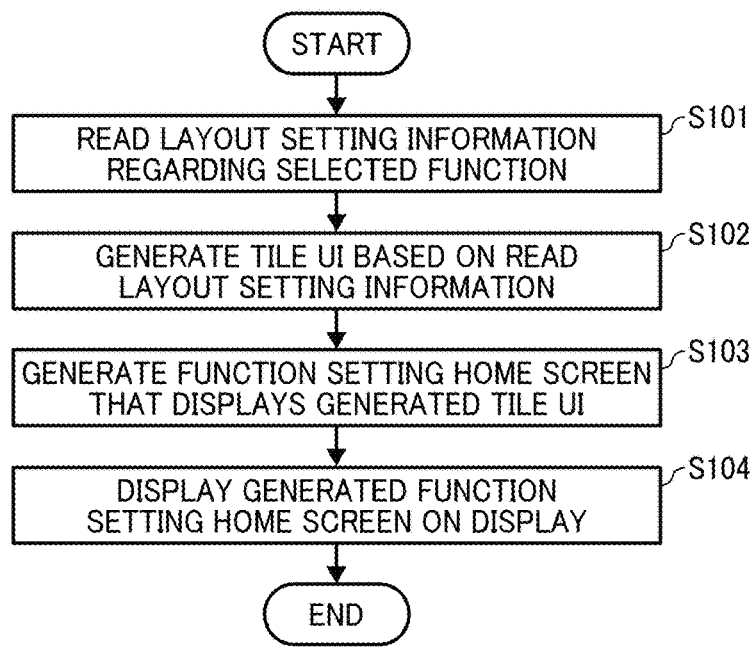
FIG. 4 is a flowchart illustrating an operation of displaying a function setting home screen as an embodiment of the present invention.

As illustrated in the close-up diagram in FIG. 1, the operation apparatus 100 displays a main menu screen on the display 16 on boot-up. On the main menu screen, multiple keys each for selecting a function are displayed. After selecting one of the keys by tapping by user operation, the function setting acceptance unit 102 starts performing an operation of displaying a screen that displays a list of setting items regarding the function corresponding to the key selected by user operation (hereinafter referred to as a function setting home screen displaying operation). The function setting home screen displaying operation performed by the function setting acceptance unit 102 is described below with reference to a flowchart illustrated in FIG. 4. In the below description, it is assumed that a key of function "copier" is tapped by user operation on the main menu screen.

First, in S101, layout setting information corresponding to the selected function (i.e., "copy" in this case) is read from the storage area 110.

FIG. 5A is a diagram illustrating a layout setting information management table 500 corresponding to the function "copier". As illustrated in FIG. 5A, the layout setting information management table 500 includes a field 501 for storing a key ID as identification information of a key corresponding to the setting item regarding the function "copier", a field 502 for storing the setting item regarding the function "copier", a field 503 for storing a "row number", a field 504 for storing an "order of layout", and a field 505 for storing a setting indicating whether or not the key is displayed (hereinafter referred to as display setting).

In this case, while only layout setting information management table 500 regarding the function "copier" is described for the sake of convenience, it is presumed that the storage area 110 stores the layout setting information management table 500 corresponding to each function included in the MFP 20 (i.e., copier, scan, facsimile, and printer etc.).

Here, values accommodated in each field of the layout setting information management table 500 are described below.

First, the "row number" in the field 503 and the "order of layout" in the field 504 are described below with reference to FIG. 6.

Figure 6:
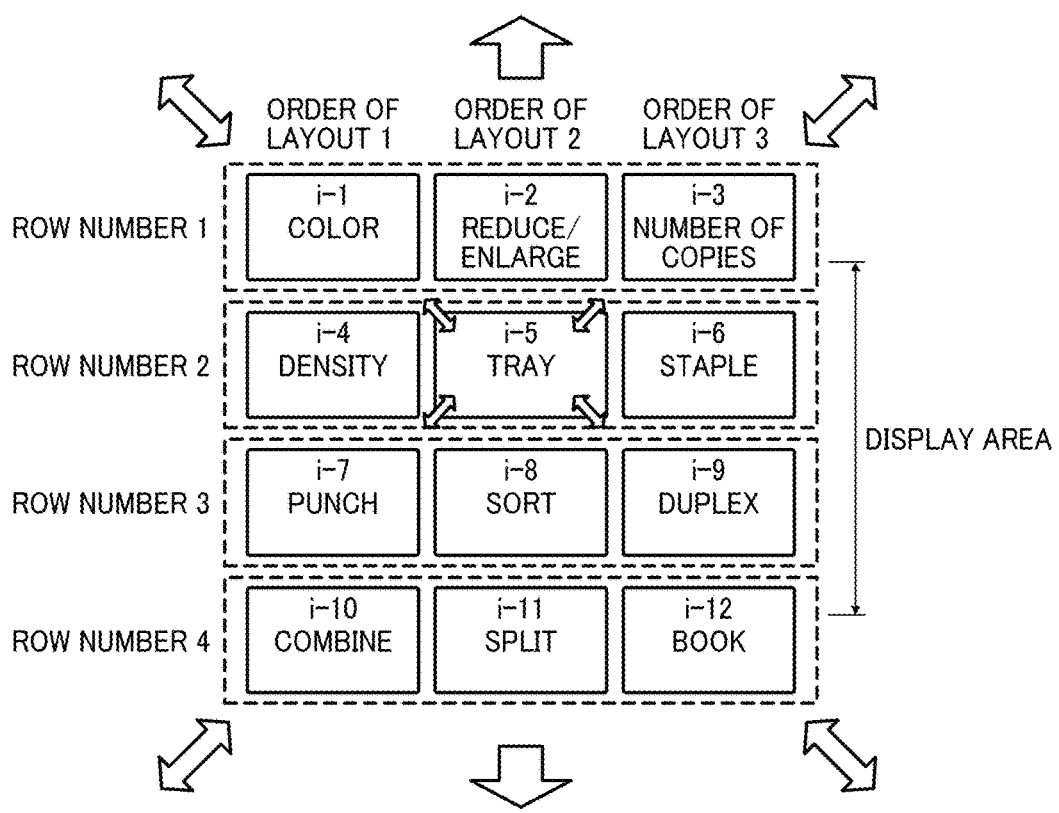
FIG. 6 is a conceptual diagram illustrating layout setting information as an embodiment of the present invention.

FIG. 6 is a diagram illustrating layout of keys displayed on the function setting home screen corresponding to the function "copier". As illustrated in FIG. 6, in the function setting home screen corresponding to the function "copier", the function setting acceptance unit 102 displays rectangular keys (i-1 to i-12) corresponding to each of the multiple setting items regarding the function "copier" (i.e., twelve setting items in this case) in matrix (in this case, three-by-four matrix). In the below description, a GUI that rectangular keys corresponding to multiple setting items are laid out in matrix is referred to as "tile UI" since its appearance looks like a tile.

Here, it is possible to use the rectangular key for transitioning to a screen that configures the setting value indicated by the key (such as color etc.). Otherwise, it is possible that the displayed key includes a button etc. and it is possible to configure the setting value instead of transitioning to another screen. For example, if "level 3" inside a key "density" is selected, it is possible that a density level increases (or decreases). Furthermore, by displaying buttons "+" and "−" on the left side or the right side of "level 3" inside the key "density", if the displayed "+" (or "−") is selected, it is possible that the density level increases (or decreases).

Here, in this embodiment, as illustrated in FIG. 6, on the tile UI, four rows adding row numbers 1 to 4 are defined. In addition, regarding each row, after defining three order of layout 1 to 3 counted from the left side, layout positions of each of twelve keys (i-1 to i-12) that construct the tile UI are defined in combination with "row number" and "order of layout". In addition, as illustrated in FIG. 5A, "row number" regarding the key corresponding to the setting item is stored in the field 503 of the record corresponding to the setting item, and "order of layout" regarding the key is stored in the field 504.

For example, as illustrated in FIG. 6, on the tile UI, the key i-1 corresponding to the setting item "color" is located at a position corresponding to order of layout 1 in the row 1. Therefore, as illustrated in FIG. 5A, row number "1" is stored in the field 503 of the record corresponding to the setting item "color", and order of layout "1" is stored in the field 504. The same goes for other keys (i-2 to i-12).

Next, a value stored in the field 505 is described below. In this embodiment, in response to a request from the administrator, regarding each of twelve keys (i-1 to i-12) that construct the tile UI, it is possible to configure whether or not the keys are displayed (i.e., displayed or non-displayed). As a result, in the field 505, as the value of display setting, "displayed" or "non-displayed" are stored.

Values stored in each field of the layout setting information management table 500 are described above. Now, the description continues with reference to FIG. 4.

After reading the layout setting information regarding the selected function "copier" in S101 as described before, the operation proceeds to S102. In S102, the tile UI is generated based on the layout setting information read in S101. More specifically, after reading values of "row number" and "order of layout" from the fields 503 and 504 of the record corresponding to the setting item in the layout setting information management table 500 in FIG. 5A and specifying a layout position of the key i corresponding to each setting item on the tile UI, based on the specified layout positions, the tile UI that twelve keys (i-1 to i-12) are laid out in three-by-four matrix is generated.

Next, in S103, after generating a function setting home screen embedding the tile UI generated in S103 in a rectangular display area for displaying the tile UI defined in a template for the function setting home screen (hereinafter referred to as a tile UI display area), in subsequent S104, the generated function setting home screen is displayed on the display 16, and the function setting home screen displaying operation is finished.

Figure 7A:
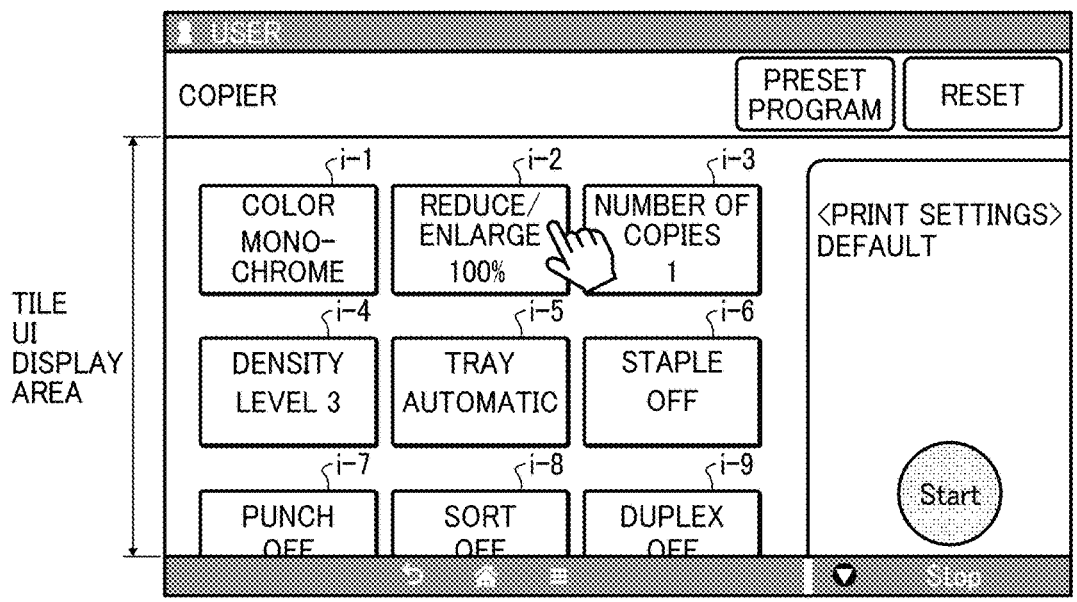
FIGS. 7A and 7B are diagrams illustrating a function setting home screen etc. as an embodiment of the present invention.

FIG. 7A is a diagram illustrating the function setting home screen for the function "copier" displayed on the display 16 of the operation apparatus 100 in S104 as described before. As illustrated in FIG. 7A, in the tile UI display area on the function setting home screen, among twelve keys (i-1 to i-12) that construct the tile UI, six keys ("color", "reduce/enlarge", "number of copies", "density", "tray", and "staple") that construct the upper two rows are completely displayed, three keys ("punch", "sort", and "duplex") are partially displayed, and remaining three keys ("combine", "split", and "book") are not displayed on the screen since those three keys are out of the tile UI display area at this point.

In addition, as illustrated in FIG. 7A, on the function setting home screen for users, "preset program" button is displayed. An operation related to the "preset program" button is described later.

Here, as illustrated in FIG. 6, the entire tile UI moves up and down as the screen scrolls. By scrolling the screen displayed initially in FIG. 7A upward, three keys ("combine", "split", and "book") hidden initially on the function setting home screen are moved to the tile UI display area to display those three keys.

Furthermore, as illustrated in FIG. 6, on the tile UI, by performing pinch-in operation and pinch-out operation, while layout positions of keys (i.e., "row number" and "order of layout" corresponding to each key) are maintained, it is possible to enlarge and reduce the entire tile UI. For example, by reducing the tile UI, it is possible to display all of the twelve keys in the tile UI display area simultaneously. In addition, as illustrated in FIG. 6, in the tile UI, it is possible to enlarge and reduce each key maintaining the layout position for each key.

Here, on each key that constructs the tile UI, a corresponding setting item and a current setting value are also displayed. In FIG. 7A, the setting item "color" and its current setting value "monochrome" are displayed on the key i-1, the setting item "reduce/enlarge" and its current setting value "100%" are displayed on the key i-2, the setting item "number of copies" and its current setting value "1" are displayed on the key i-3, the setting item "density" and its current setting value "level 3" are displayed on the key i-4, the setting item "tray" and its current setting value "automatic" are displayed on the key i-5, and the setting item "staple" and its current setting value "off" are displayed on the key i-6. The same goes for remaining six keys ("punch", "sort", "duplex", "combine", and "split") similarly.

Figure 7B:
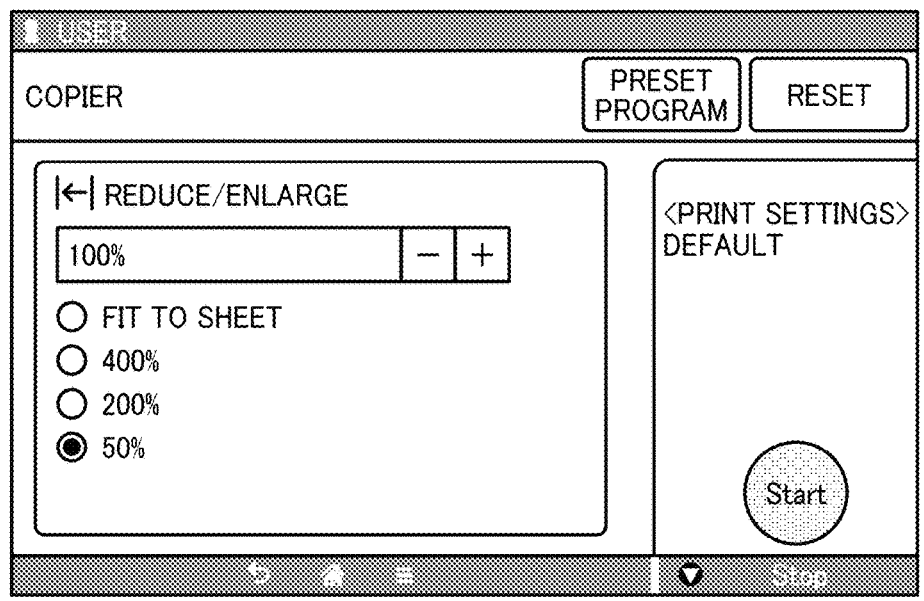

In this embodiment, if any one key in the tile UI is tapped by user operation, the screen transitions to a detailed setting screen for inputting a setting value for a setting item corresponding to the tapped key. In FIG. 7B, after the key i-2 corresponding to the setting item "reduce/enlarge" is tapped by user operation, the screen transitions to a detailed setting screen for "reduce/enlarge". It is possible to input a setting value for a setting item via the detailed setting screen by user operation.

Figure 8A:
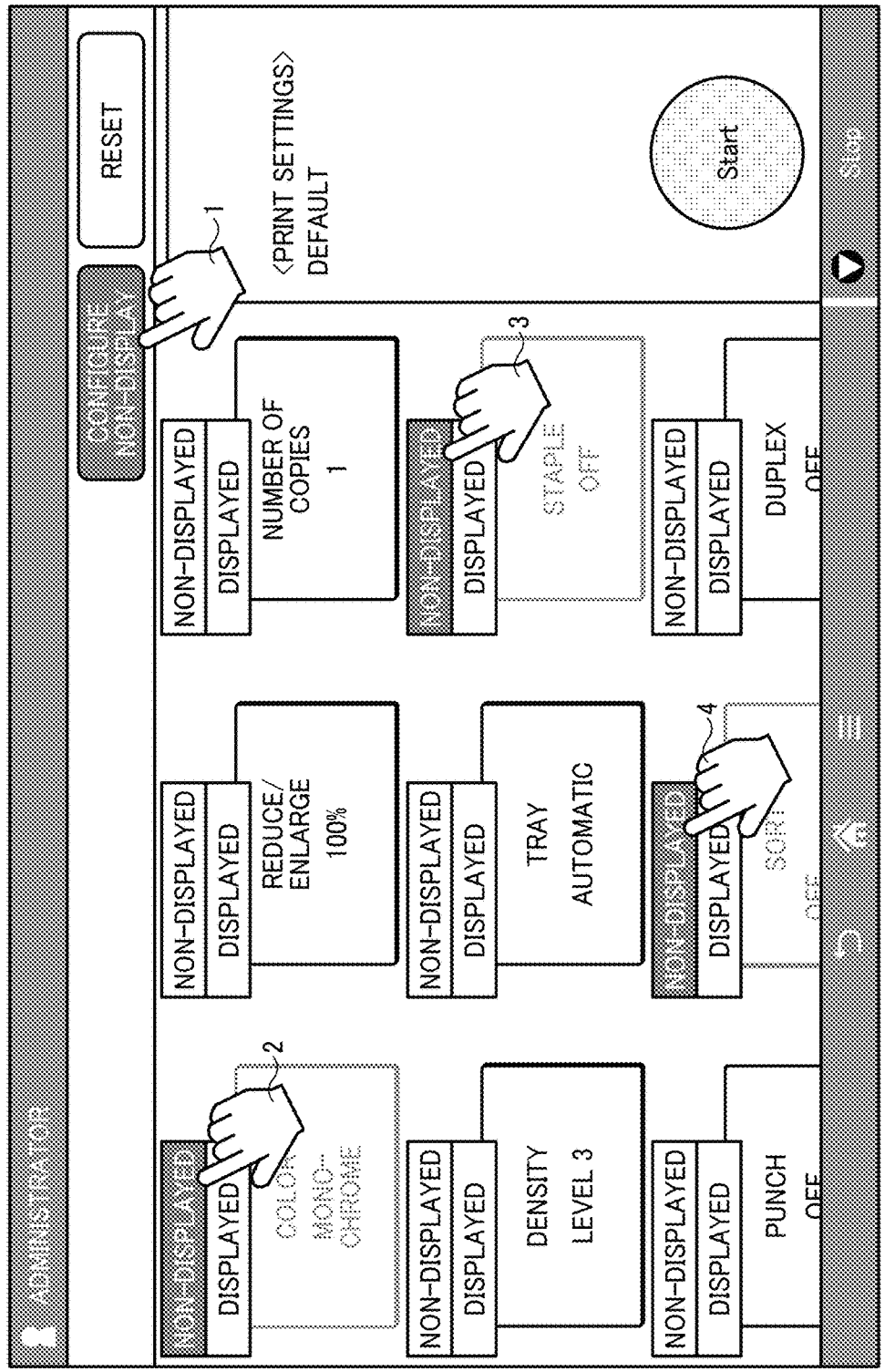
FIGS. 8A and 8B are diagrams illustrating a function setting home screen as an embodiment of the present invention.

On the other hand, FIG. 8A is a diagram illustrating a function setting home screen for administrators. As illustrated in FIG. 8A, a "configure non-display" button is displayed on the function setting home screen for administrators. In this embodiment, after the "configure non-display" button is tapped by administrator operation, the non-display configuration unit 106 displays context menus (non-displayed/displayed) on each key in the tile UI. After "non-displayed" in the context menu is tapped by administrator operation, the non-display configuration unit 106 stores "non-displayed" in the field 505 for the corresponding key in the layout setting information management table 500.

Figure 8B:
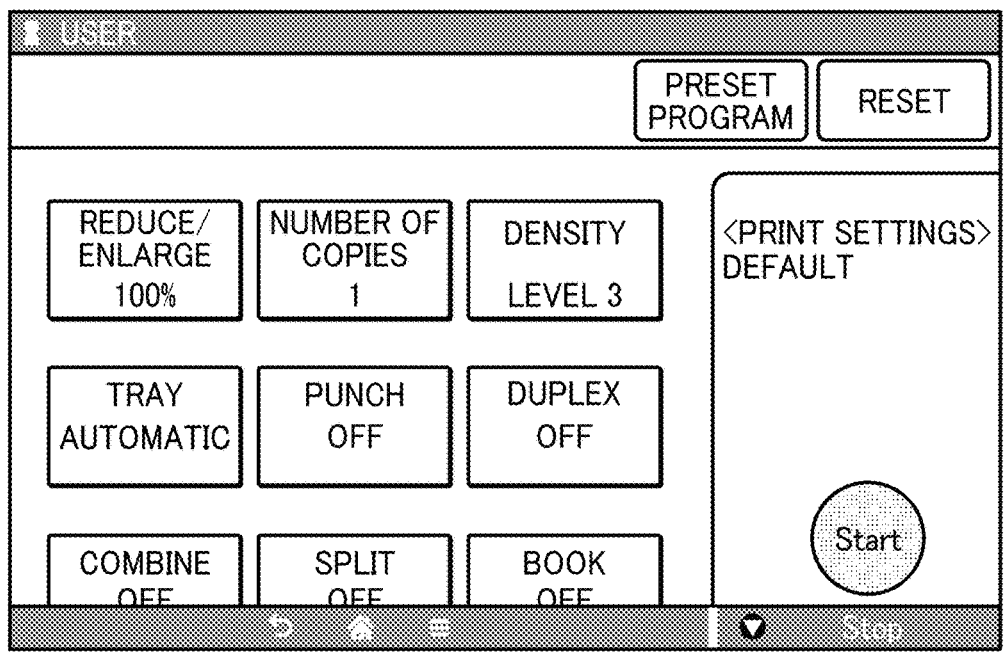

In FIG. 8A, an operation that configures three keys ("color", "staple", and "sort") as "non-displayed" by administrator operation is illustrated. After performing the operation, on the function setting home screen for users, the tile UI illustrated in FIG. 8B is displayed. In this case, three keys ("color", "staple", and "sort") disappear from the tile UI, and the remaining nine keys reconstruct the three-by-three matrix.

Figure 9:
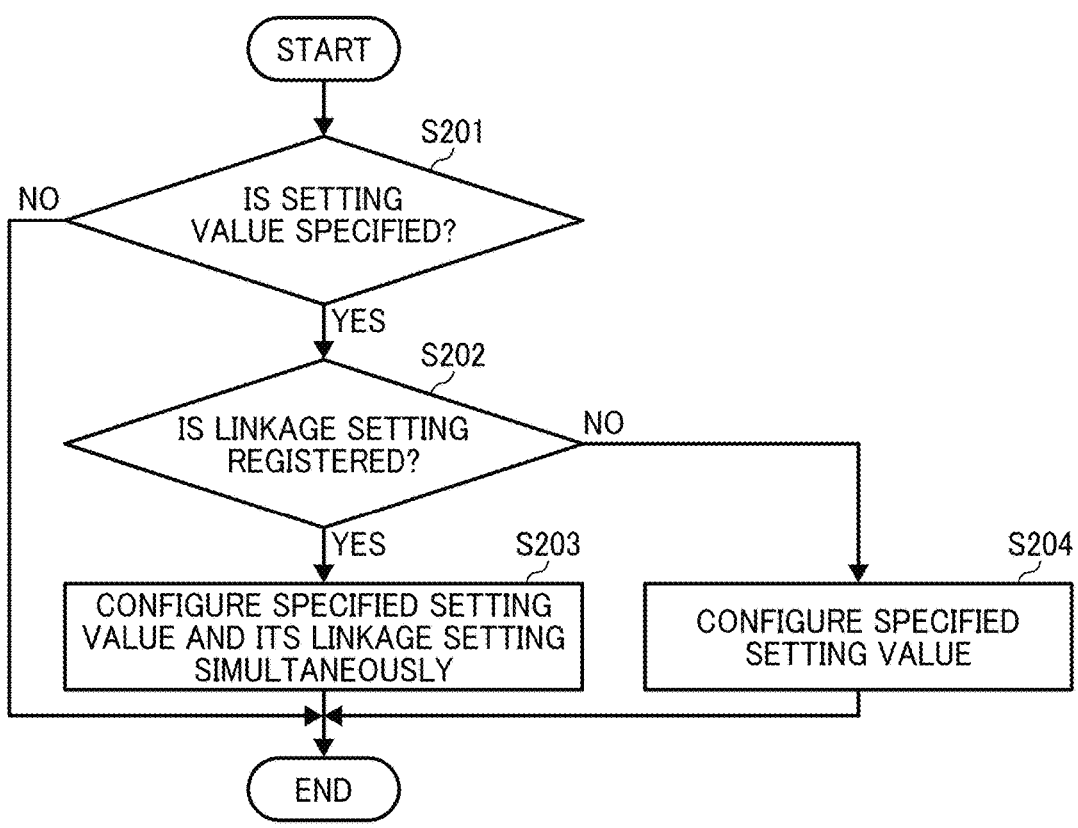
FIG. 9 is a flowchart illustrating an operation of configuring setting values as an embodiment of the present invention.

The function setting home screen displaying operation performed by the function setting acceptance unit 102 is described above. An operation of configuring setting values performed by the setting value configuration unit 104 is described below with reference to a flowchart illustrated in FIG. 9.

After the function setting home screen is displayed on the display 16 of the operation apparatus 100, an operation of selecting a key that constructs the tile UI and commanding to configure a setting corresponding to the selected key is performed by user operation. In response, the setting value configuration unit 104 performs an operation described below.

First, in S201, it is determined whether or not a setting value is specified by user operation. Subsequently, if it is determined that the setting value is not specified (NO in S201), the operation ends as is. By contrast, if it is determined that the setting value is specified (YES in S201), in subsequent S202, it is determined whether or not a linkage setting is registered associated with the setting item corresponding to the specified setting value.

Here, the determination in S202 is performed based on the linkage setting management table 600 illustrated in FIG. 5B. As illustrated in FIG. 5B, the linkage setting management table 600 includes a field 601 that stores a setting item and a field 602 that stores a setting item that should be automatically configured if the setting item stored in the field 601 is configured (hereinafter referred to as a linkage setting item) associating the setting item with the linkage setting item.

In subsequent S202, it is determined whether or not the setting item whose setting value is specified by user operation is stored in the field 601 of the linkage setting management table 600. If it is determined that the setting item is not stored in the field 601, that is, if no linkage setting corresponding to the specified setting item is registered (NO in S202), in subsequent S204, the specified setting value is configured, and the operation ends.

By contrast, if it is determined that the setting item whose setting value is specified by user operation is stored in filed 701 of the linkage setting management table 600, that is, if the linkage setting corresponding to the specified setting item is registered (YES in S202), in subsequent S203, the setting value of the specified setting value and the setting value of the linkage setting item associated with the setting item are simultaneously configured en bloc, and the operation ends.

The operation of configuring setting values performed by the setting value configuration unit 104 is described above. An operation related to the preset program performed by the same setting value configuration unit 104 is described below.

Figure 10A:
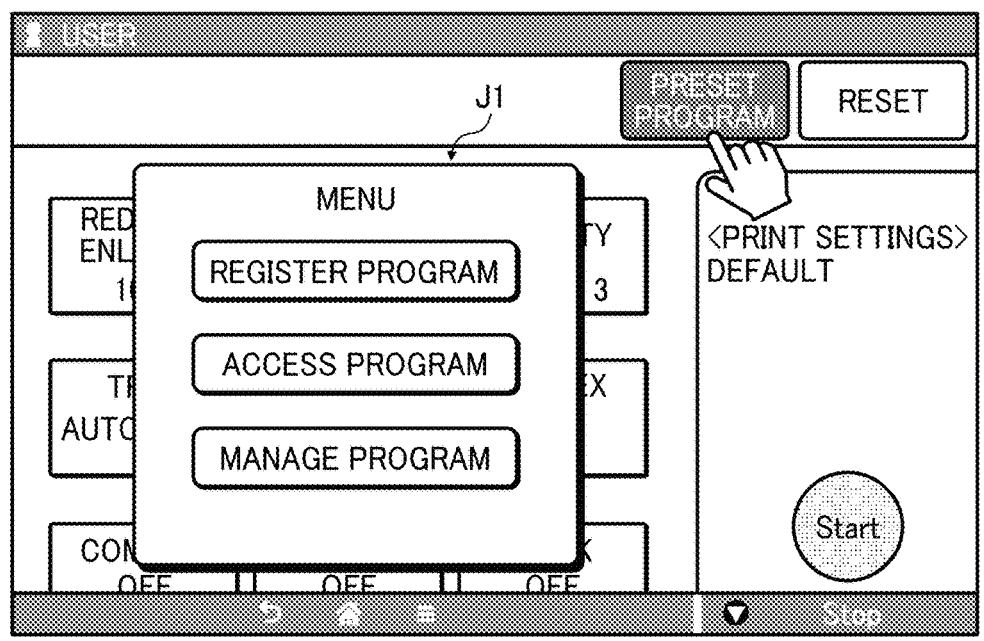
FIGS. 10A, 10B, and 10C are diagrams illustrating an operation related to a preset program as an embodiment of the present invention.

After tapping the "preset program" button displayed on the function setting home screen by user operation, as illustrated in FIG. 10A, the setting value configuration unit 104 displays a dialog J1 including three menu buttons, a "register program" button, "access program" button, and a "manage program" button overlapping on the function setting home screen.

Figure 10B:
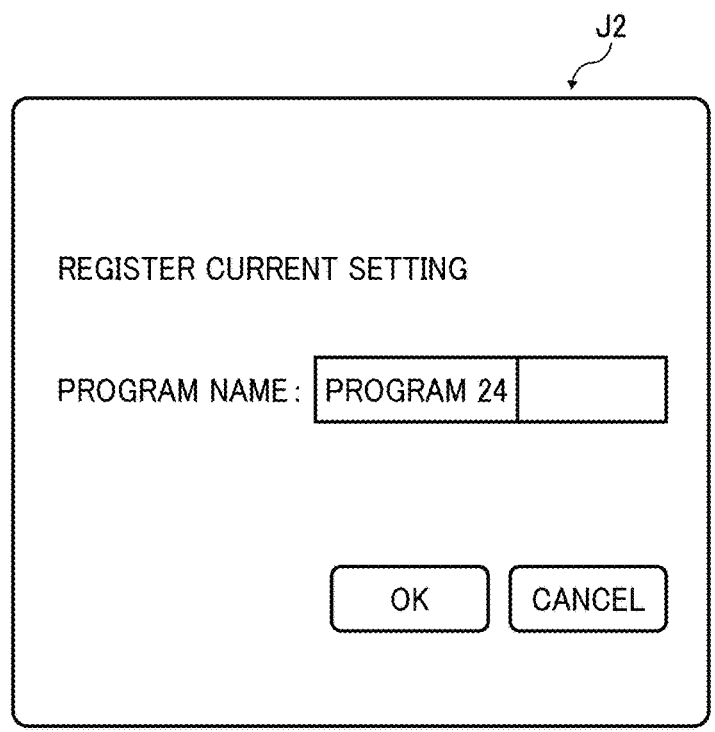

After tapping the "register program" button displayed on the dialog J1 by user operation, the setting value configuration unit 104 displays a dialog J2 illustrated in FIG. 10B overlapping on the function setting home screen. As illustrated in FIG. 10B, in the dialog J2, a message "register current setting" is displayed along with a text field for inputting a program name to be registered. In response, after inputting an arbitrary program name in the text field and tapping the "OK" button, the setting value configuration unit 104 allocates a program ID to a combination of setting values for each setting item at that time and stores the configured content in the preset program management table 700.

FIG. 11 is a diagram illustrating the preset program management table in this embodiment. As illustrated in FIG. 11, the preset program management table 700 includes a field 701 that stores the program ID, a field 702 that stores the program name, and a field 703 that stores the configured content (that is, a setting item and its setting value).

Figure 10C:
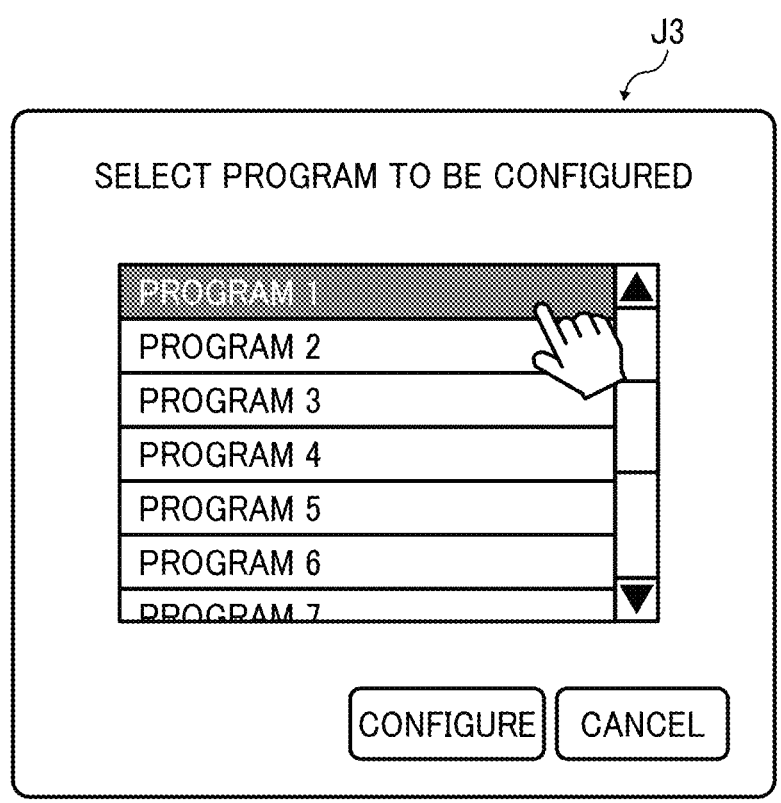

By contrast, after tapping the "access program" button displayed on the dialog J1 by user operation, the setting value configuration unit 104 displays a dialog J3 illustrated in FIG. 10C overlapping on the function setting home screen. As illustrated in FIG. 10C, in the dialog J3, a list of program names for registered preset programs are displayed in a selectable manner. In response, if any one of the program names is selected by user operation, the setting value configuration unit 104 reads the setting content (the setting item and its setting value) associated with the selected program name from the preset program management table 700 and configures the setting content automatically.

Figure 12:
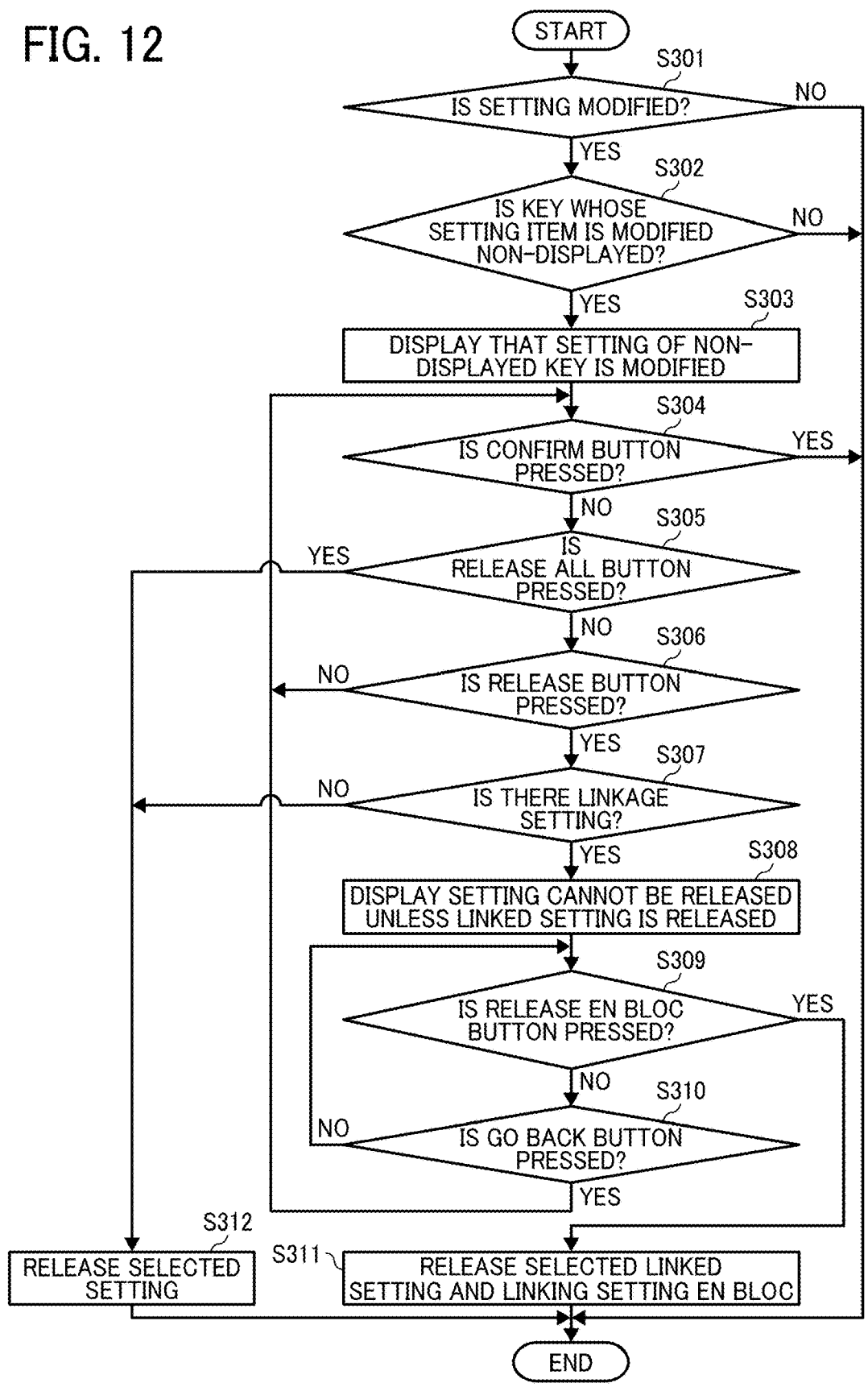
FIG. 12 is a flowchart illustrating an operation performed by the operation apparatus as an embodiment of the present invention.

The operation related to the preset program performed by the setting value configuration unit 104 is described above. An operation performed by the setting modification reporter 108 cooperating with the setting value configuration unit 104 is described below with reference to a flowchart illustrated in FIG. 12.

The setting modification reporter 108 performs an operation in steps S301 to S310 described below.

First, in S301, it is determined whether or not a setting is modified. As a result, if it is determined that the setting is not modified (NO in S301), the operation ends as is. By contrast, if it is determined that the setting is modified (YES in S301), in subsequent S302, it is determined whether or not a key corresponding to the modified setting item is set to non-displayed.

As a result, if it is determined that the key corresponding to the modified setting item is not set to non-displayed (NO in S302), the operation ends as is. By contrast, if it is determined that the key corresponding to the modified setting item is set to non-displayed (YES in S302), in subsequent S303, it is reported that the setting content related to the key configured as non-displayed in a predetermined way. In this embodiment, the way reporting that the setting content of the non-displayed key is modified is not limited. Here, a case that reports that the setting content of the non-displayed key is modified by displaying a dialog is described below.

Figure 13A:
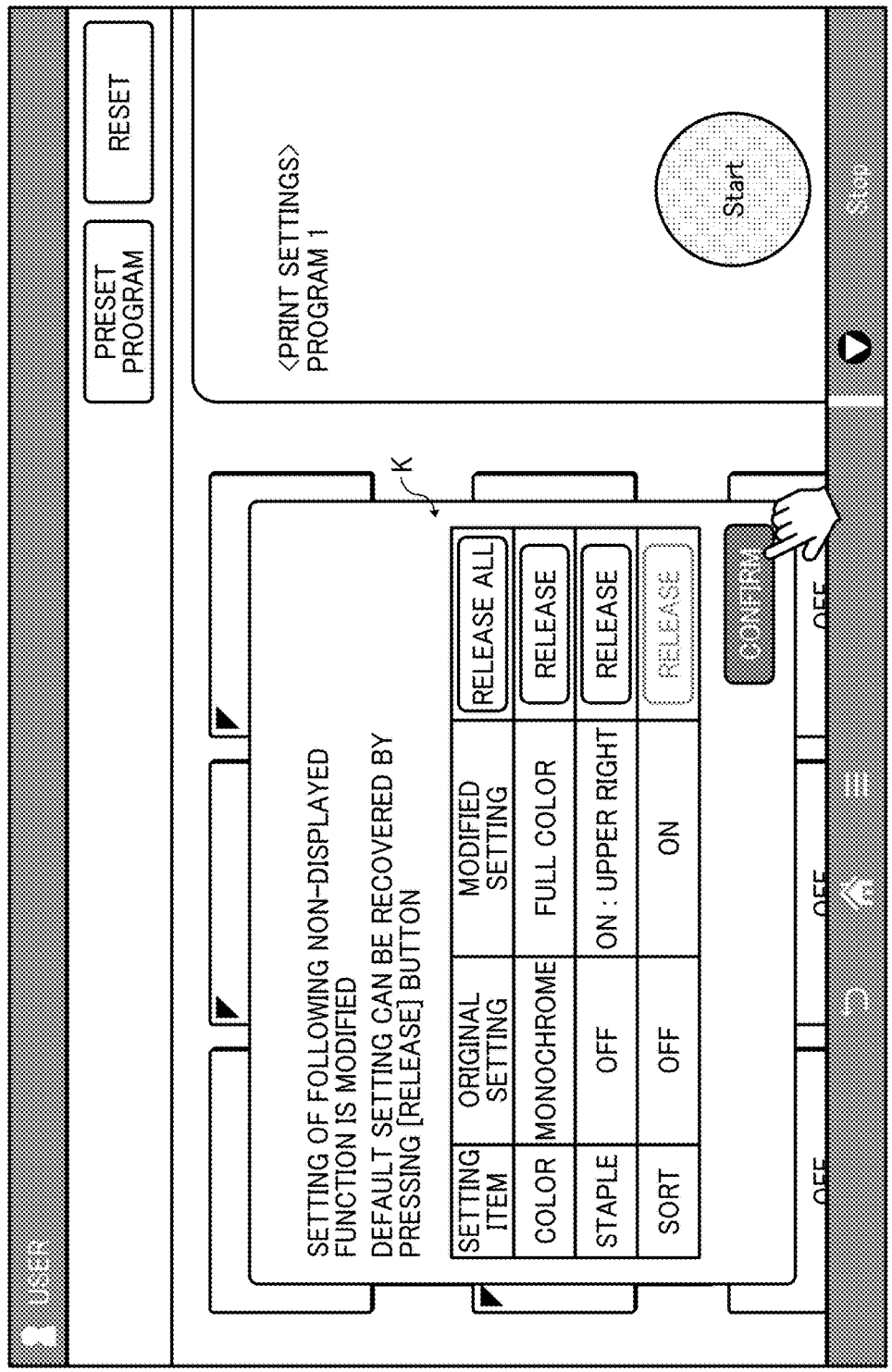
FIGS. 13A and 13B are diagrams illustrating a function setting home screen as an embodiment of the present invention.

In FIG. 13A, if a preset program "program 1" is configured by user operation and three setting items ("color", "staple", and "sort") that constructs the program 1 are configured as non-displayed, a dialog K indicating that the setting content regarding the key configured as non-displayed is modified overlapping on the function setting home screen. As illustrated in FIG. 13A, in the dialog K, a message reporting "Setting of non-displayed key is modified. Default setting can be recovered by pressing "release" button" is displayed. In addition, in the dialog K, a list constructed by three setting items ("color", "staple", and "sort") whose corresponding keys are configured as "non-displayed" is displayed along with setting values before modification and after modification.

In addition, in the dialog K, a "release" button for releasing setting values for the modified setting items (that is, getting setting values for the modified setting items back to default setting values), a "release all" button for releasing setting values for the modified three setting items en bloc, and a "confirm" button are displayed. Among them, the "release" button for releasing the setting value for setting item "sort" is grayed out. This is because "sort" is the linked setting item for "staple", so it is prevented to accept releasing "sort" separately. An operation of generating the dialog K described above is described later.

In subsequent S304, it is determined whether or not the "confirm" button is tapped by user operation. If it is determined that the "confirm" button is tapped by user operation (YES in S304), the operation ends as is.

Figure 13B:
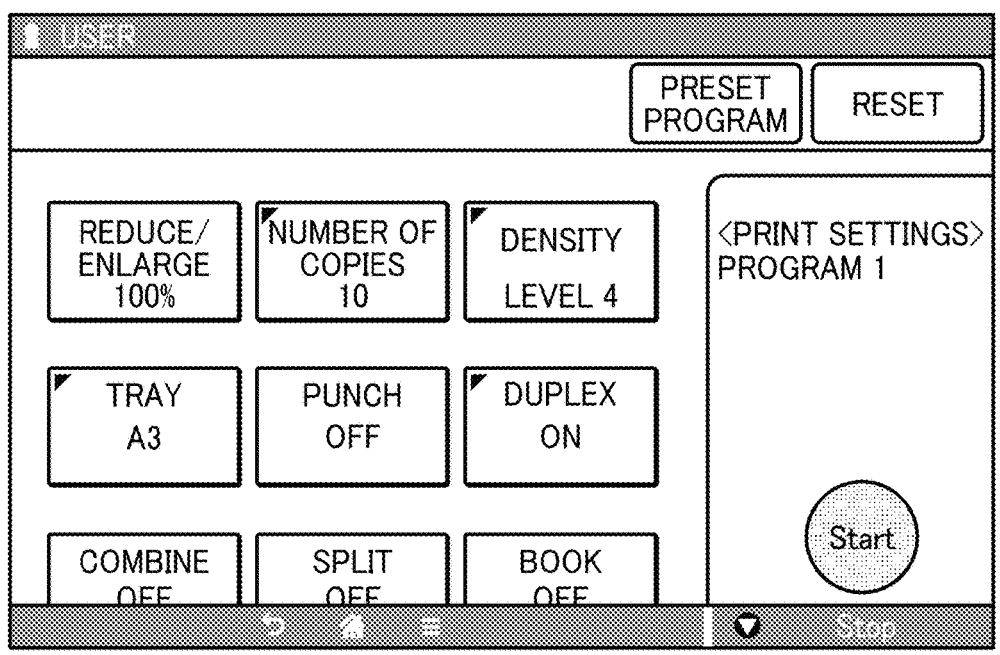

FIG. 13B is a diagram illustrating a function setting home screen after tapping the "confirm" button in the dialog K by user operation in this embodiment. In the function setting home screen illustrated in FIG. 13B, among setting items whose setting contents are modified from the default settings due to the configuration of "program 1", on the upper left corner of keys corresponding four setting items ("number of copies", "density", "tray", and "duplex") whose keys are configured as "displayed", symbols (triangle marks) indicating that the setting content is modified from the default setting are displayed.

By contrast, if it is determined that the "confirm" button is not tapped by user operation (NO in S304), in subsequent S305, it is determined whether or not the "release all" button is tapped by user operation. As a result, if it is determined that the "release all" button is tapped by user operation (YES in S305), in subsequent S312, the setting value configuration unit 104 releases the selected settings (that is, all settings in this case) en bloc (that is, the setting values are got back to the default values (default settings)), and the operation ends.

By contrast, if it is determined that the "release all" button is not tapped by user operation (NO in S305), in subsequent S306, it is determined whether or not the "release" button is tapped by user operation. As a result, if it is determined that the "release" button is tapped by user operation (YES in S306), in subsequent S307, it is determined whether or not the linkage setting that considers the setting item corresponding to the tapped "release" button as the linked settings is registered. As a result, if it is determined that no linkage setting that considers the setting item corresponding to the "release" button is registered (NO in S307), in subsequent S312, the setting value configuration unit 104 releases the setting selected by tapping the "release" button (that is, by getting the setting value back to the default value), and the operation ends.

By contrast, if it is determined that the linkage setting that considers the setting item corresponding to the "release" button is registered (YES in S307), in subsequent S308, it is reported that it is impossible to release the selected linked setting without releasing the linking setting in a predetermined manner. In this embodiment, the way displaying that it is impossible to release the selected linked setting without releasing the linking setting is not limited. Here, a case displaying that it is impossible to release the selected linked setting without releasing the linking setting in a dialog is described below.

Figure 14A:
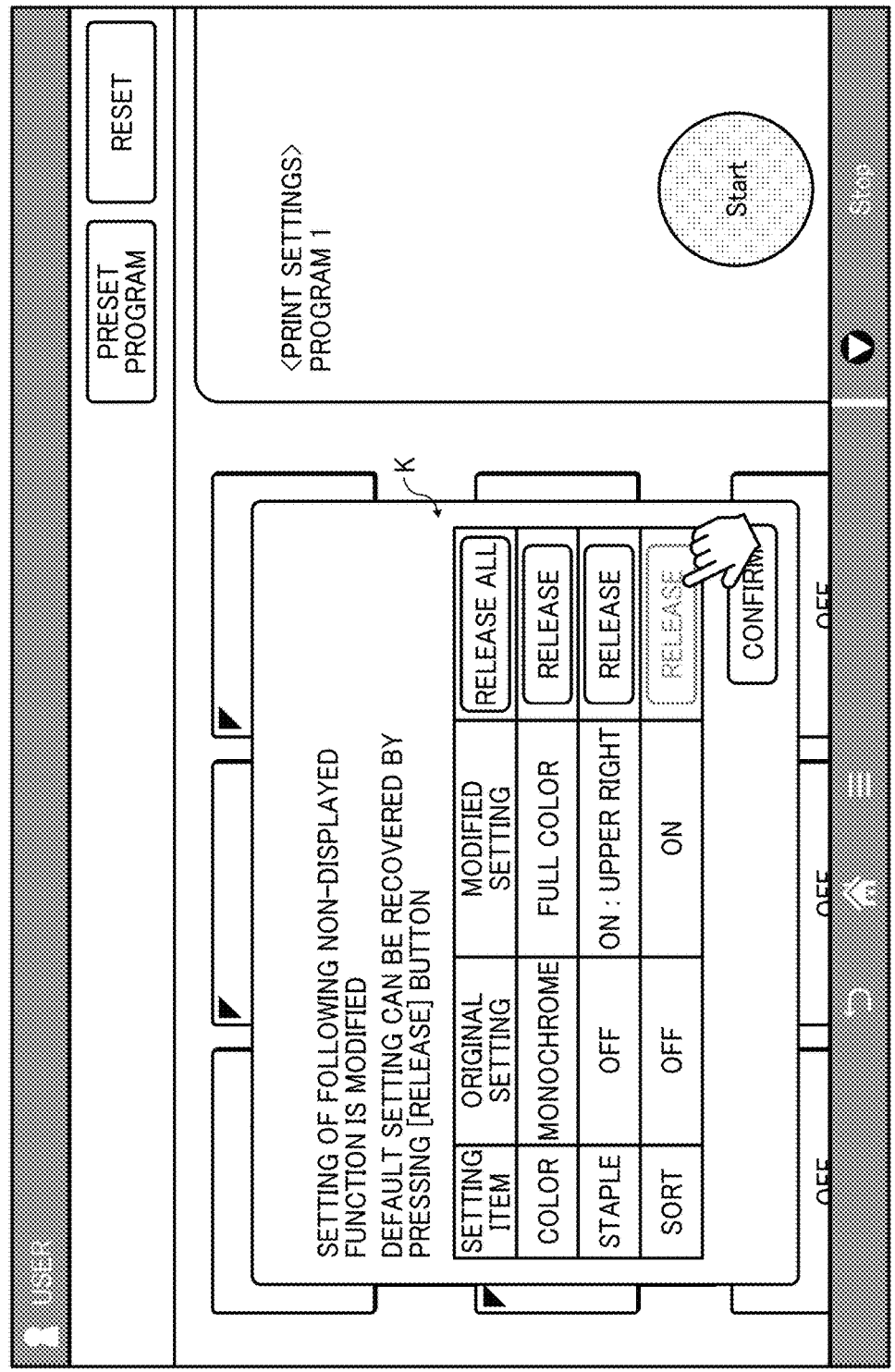
FIGS. 14A and 14B are diagrams illustrating a function setting home screen as an embodiment of the present invention.
Figure 14B:
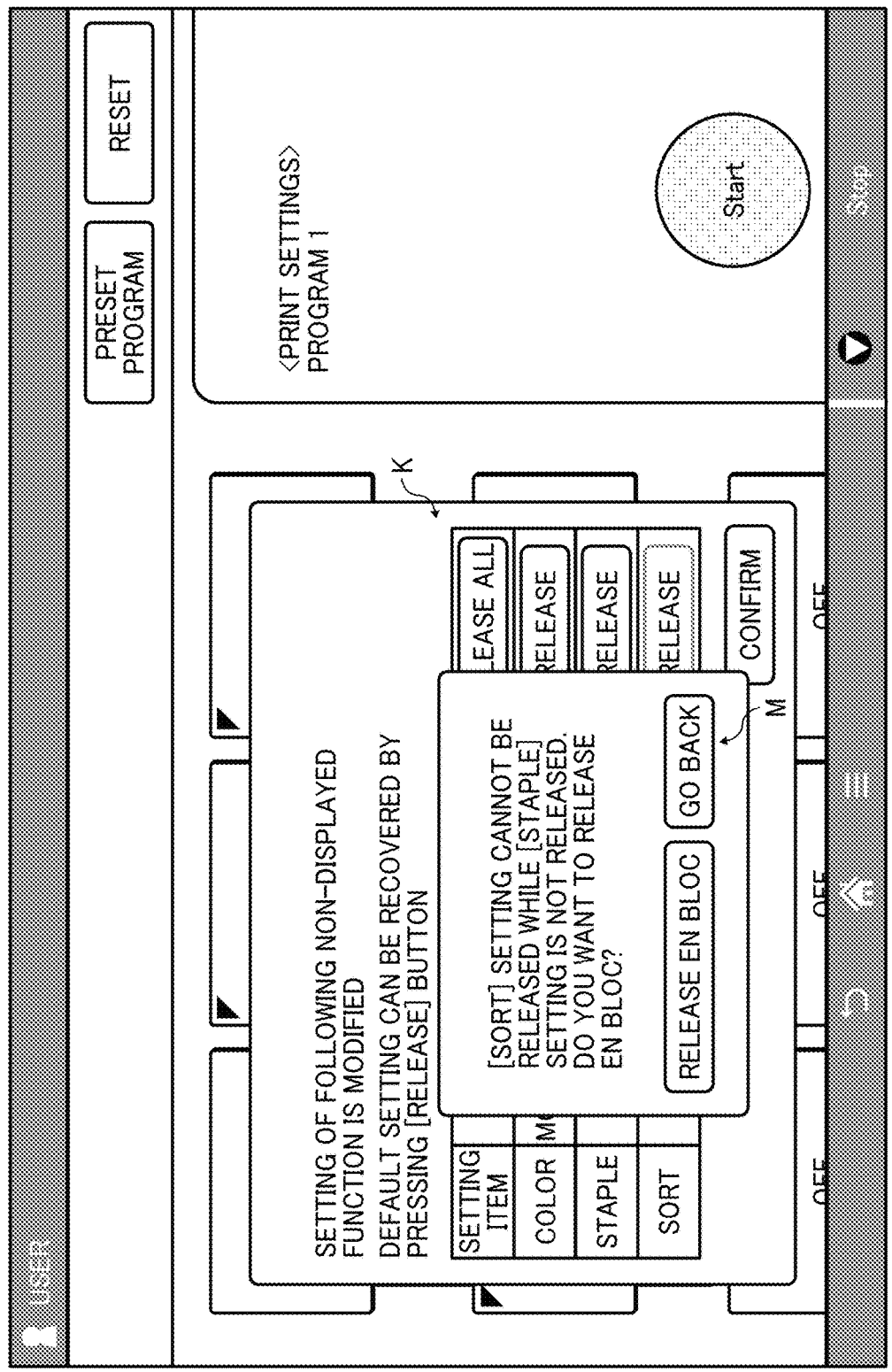

In this embodiment, as illustrated in FIG. 14A, after touching a user's finger on the "release" button (displayed grayed-out) for releasing a setting value for a setting item "sort", as illustrated in FIG. 14B, a dialog M is displayed overlapping on the dialog K. As illustrated in FIG. 14B, in the dialog M, a message indicating "[Sort] setting cannot be released while [staple] setting is not released. Do you want to release settings en bloc?" is displayed along with the "release all" button and "go back" button.

In subsequent S308, after displaying the message indicating that the selected linked setting cannot be released without releasing the linking setting, the step proceeds to S309.

In subsequent S309, either the operation waits until the "release all" button is tapped by user operation or the operation waits until the "go back" button is tapped by user operation (NO in S309 and NO in S310). As a result, if the "go back" button is tapped by user operation (YES in S310), the step goes back to S304, and it is determined whether or not the "confirm" button is tapped again.

By contrast, if the "release all" button is tapped by user operation (YES in S309), in subsequent S311, the linked setting selected by tapping the "release" button and its linking setting are released en block (that is, the setting value is got back to the default value), and the operation ends.

Figure 15:
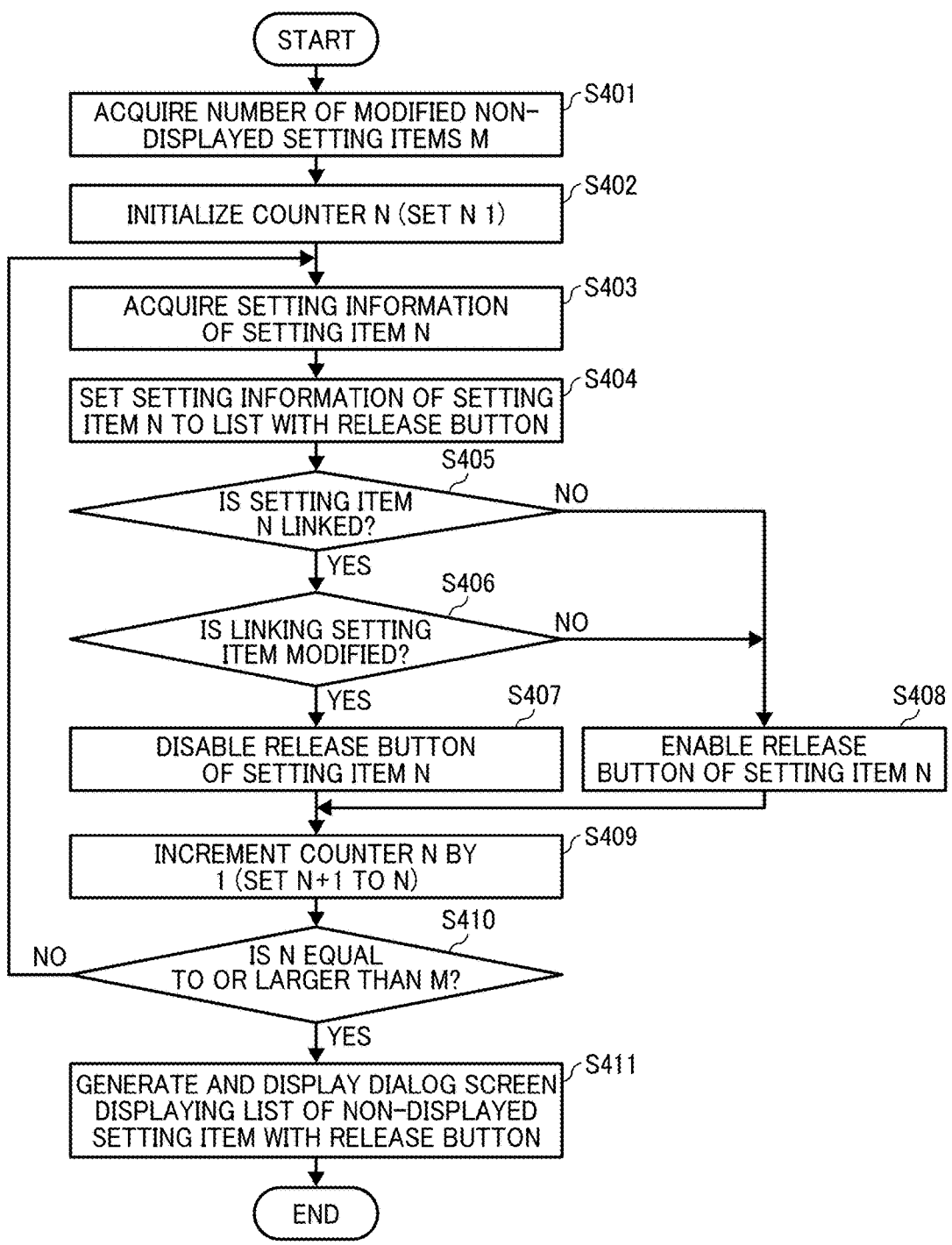
FIG. 15 is a flowchart illustrating an operation performed by the operation apparatus as an embodiment of the present invention.

Here, an operation of generating the dialog K (illustrated in FIG. 13) performed in S302 as described before is described below with reference to a flowchart illustrated in FIG. 15.

First, in S401, after acquiring the number of items M for the modified non-displayed setting items, in subsequent S402, the counter N is initialized (that is, a value 1 is set to N). An operation described below is performed by focusing attention on the M specified setting items.

In subsequent S403, among the M setting items, after acquiring setting information (that is, a setting value before modification and a setting value after modification) on the focused setting item N, in subsequent S404, after setting the acquired setting information on the setting item N to a list with a release button, and the step proceeds to S405.

In subsequent S405, it is determined whether or not the focused setting item N is the linked setting item in the linkage setting registration. As a result, if it is determined that the focused setting item N is not linked (NO in S405), the step proceeds to S408. Subsequently, on the list with the release button, the "release" button corresponding to the configured setting item N is enabled (displayed brightly).

By contrast, if it is determined that the focused setting item N is linked (YES in S405), in subsequent step S406, it is determined whether or not the setting value for the setting item linking to the setting item N is modified. As a result, if it is determined that the focused setting item N is not modified (NO in S406), the step proceeds to S408. Subsequently, on the list with the release button, the "release" button corresponding to the configured setting item N is enabled (displayed brightly).

By contrast, if it is determined that the focused setting item N is modified (YES in S406), the step proceeds to S407. Subsequently, on the list with the release button, the "release" button corresponding to the configured setting item N is disabled (displayed grayed-out).

After configuring the "release" button as either enabled or disabled, in subsequent S409, the value of the counter N is incremented by 1. In subsequent S410, it is determined whether or not the value of the counter N reaches M (that is, the number of items for the modified non-displayed setting items). As a result, if the value of the counter N does not reach M (NO in S410), the step goes back to S403. Subsequently, the operation S403 to S410 described above is repeated until the value of the counter N reaches the number of items M.

By contrast, if the value of the counter N reaches the number of items M (YES in S410), the step proceeds to S411. After generating and displaying the dialog K that displays the list indicating enabled/disabled for the "release" buttons corresponding to each of the M setting items, the operation ends.

Figure 16A:
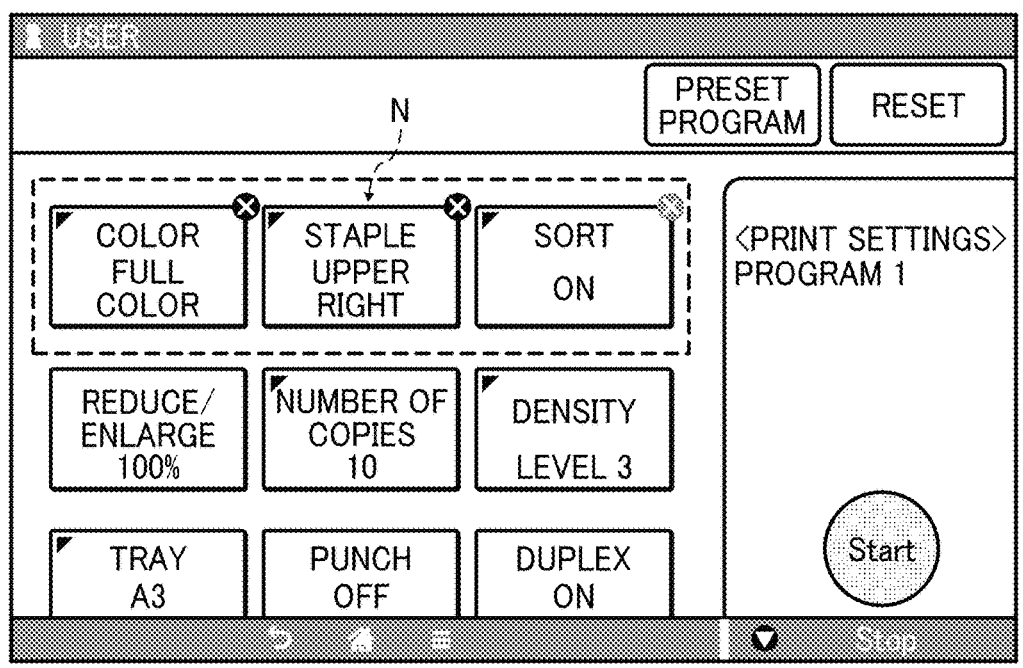
FIGS. 16A and 16B are diagrams illustrating a function setting home screen as an embodiment of the present invention.

In another embodiment, it is possible to report that the setting content of the non-displayed key by displaying a dialog in a way illustrated in FIG. 16A.

In the case illustrated in FIG. 16A, among setting items whose contents are modified from the default settings due to the configuration of the "program 1", keys for three setting items ("color", "staple", and "sort") are temporarily displayed again overlapping on the "function setting home screen" to report that the setting content of the non-displayed keys are modified. In this case, three keys are displayed at an area N in the top of the tile UI, and the three keys are displayed at the display area separately from the display area where the other keys that have already been displayed. As a result, instead of losing feeling of operating the UI customized by user operation, it is possible to report that the setting content of the non-displayed keys are modified.

In the case described above, the modified setting values are displayed on each key displayed at the top row. On the upper right corner of each key, an icon (circled X) for releasing the modified setting value is displayed. Among those icons, the icon (circled X) for releasing the setting value for the setting item "sort" is grayed-out not to accept tapping by user operation.

Figure 16B:
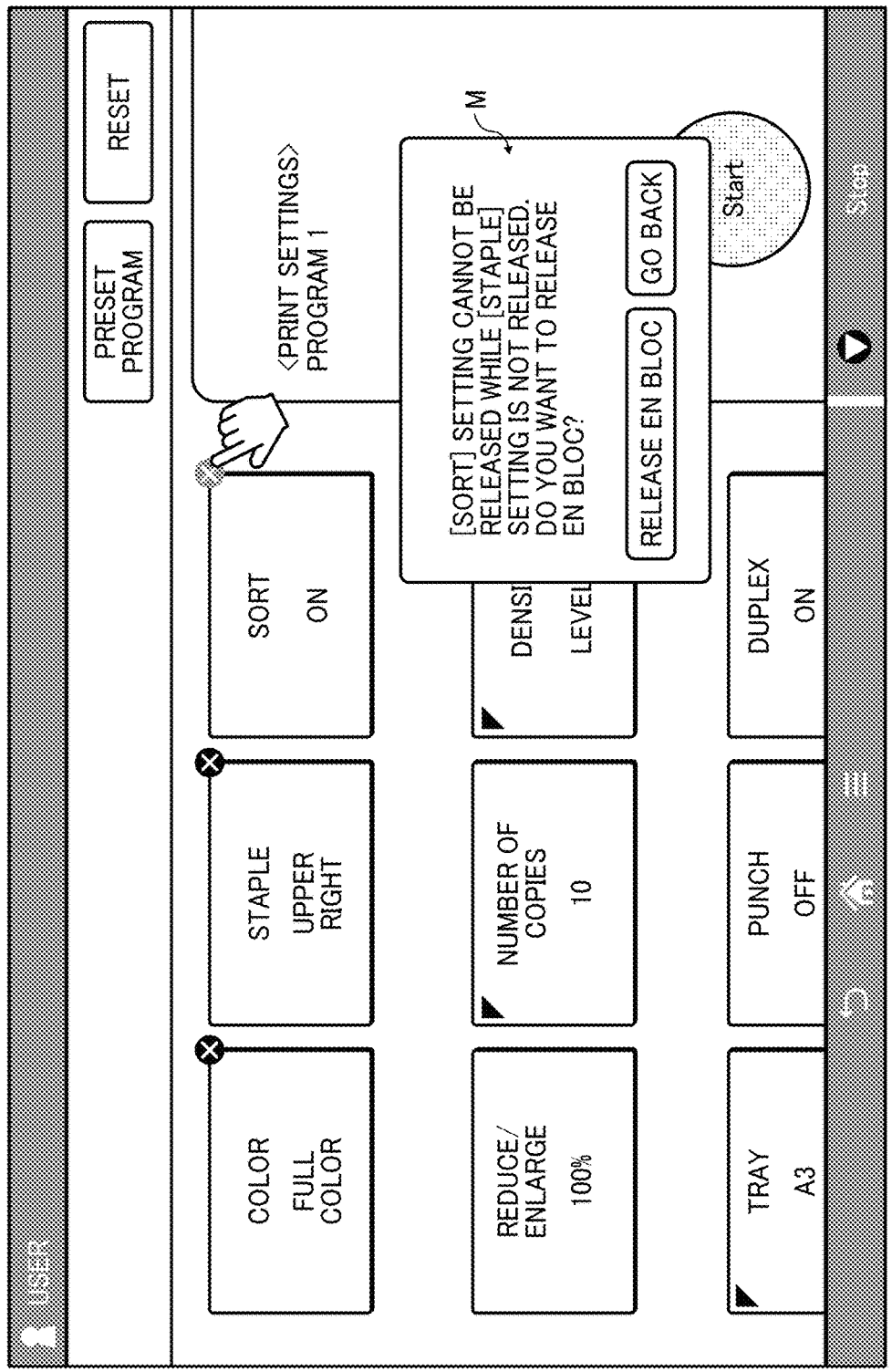

In the case described above, after touching user's finger on the icon (circled X) for releasing the setting value for the setting item "sort", as illustrated in FIG. 16B, the dialog M just like the one described before is displayed overlapping on the function setting home screen.

Figure 17A:
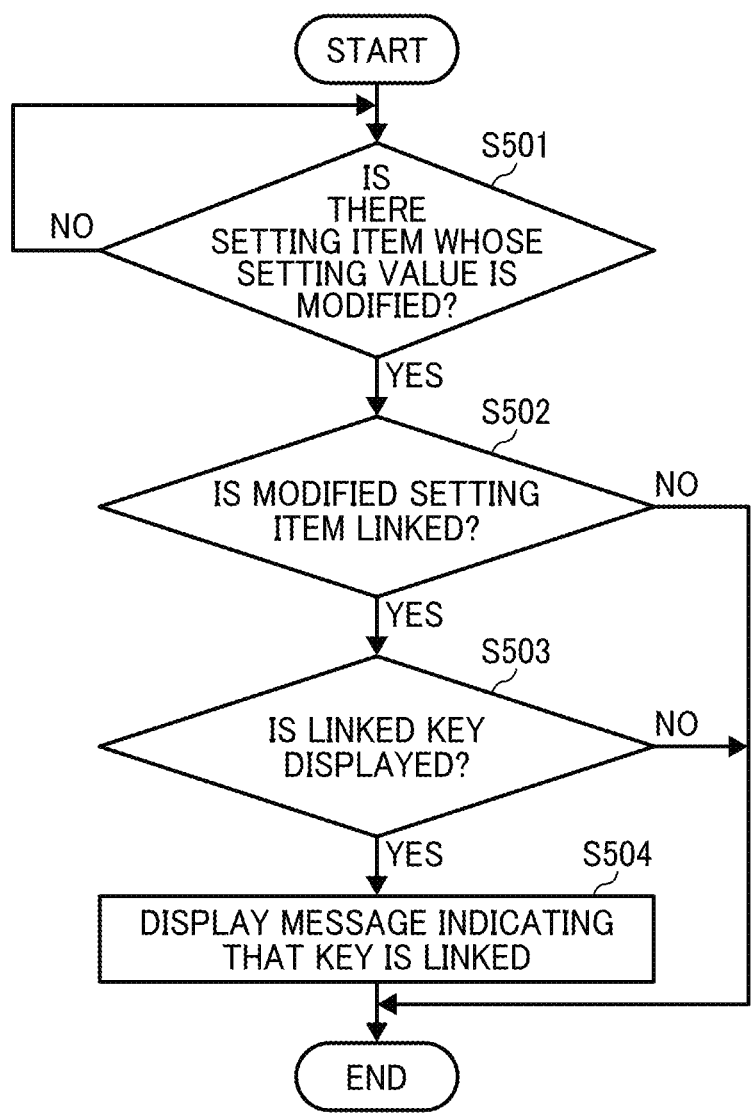
FIGS. 17A and 17B are flowcharts illustrating an operation performed by the operation apparatus as an embodiment of the present invention.

Furthermore, in another embodiment, it is possible to report that the setting value is modified due to the linkage setting. In this case, the setting modification reporter 108 performs an operation illustrated in a flowchart in FIG. 17A.

First, in S501, it is determined whether or not a setting item whose setting value is modified exists. As a result, if it is determined that there is a setting item whose setting value is modified (YES in S501), in subsequent S502, it is determined whether or not the setting item whose setting value is modified is a linked setting for the linkage setting. As a result, if it is determined that the setting item is not linked (NO in S502), the operation ends as is.

By contrast, if it is determined that the setting item is linked (YES in S502), in subsequent S503, it is determined whether or not the display setting of the target setting item is set to "displayed". As a result, if it is determined that the display setting of the key corresponding to the target setting item is set to "non-displayed" (NO in S503), the operation ends as is.

By contrast, if it is determined that the display setting of the target setting item is set to "displayed" (YES in S503), the step proceeds to S504. In subsequent S504, regarding the key of the target setting item (that is, the linked setting item), it is displayed that the target key is the key of the linked setting item for the linkage setting in an appropriate style.

Figure 17B:
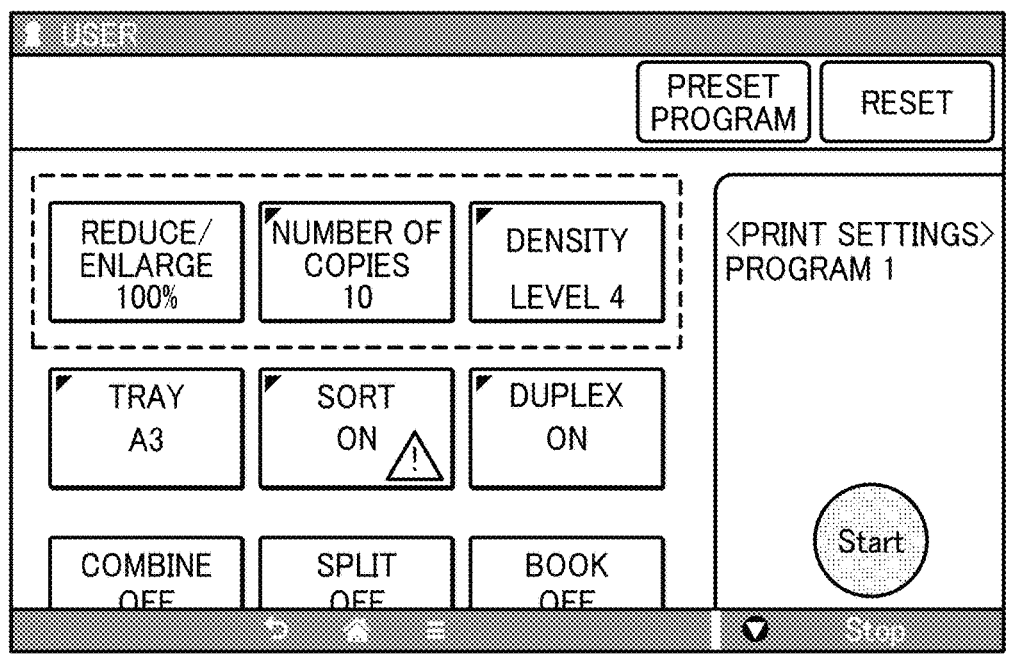

In FIG. 17B, on the "sort" key that a symbol (triangle mark) indicating that the setting value is modified is displayed, a symbol (an exclamation mark) indicating that the target key is the key of the linked setting item for the linkage setting is displayed. As described above, by reporting that the target key corresponds to the key of the linked setting item, in addition to knowing that the setting value of the "sort" key is modified, it is possible to know that the target setting value is modified due to the linkage setting.

As described above, in this embodiment, it is possible to confirm that the setting regarding the non-displayed key is modified. Consequently, as needed, it is possible to release the modified setting, and it is possible to prevent a job from being executed with unintentional settings.

In this embodiment, the UI for releasing the modified setting regarding the non-displayed key is provided along with the notification that the setting regarding the non-displayed key is modified. As a result, it is unnecessary to release the setting after redisplaying the non-displayed key.

In addition, in this embodiment, the UI for releasing the modified setting regarding the non-displayed key is provided to the user in a way considering the linkage setting. Therefore, it is possible to release the setting appropriately.

The present invention is not limited to the embodiments described above.

Figure 18A:
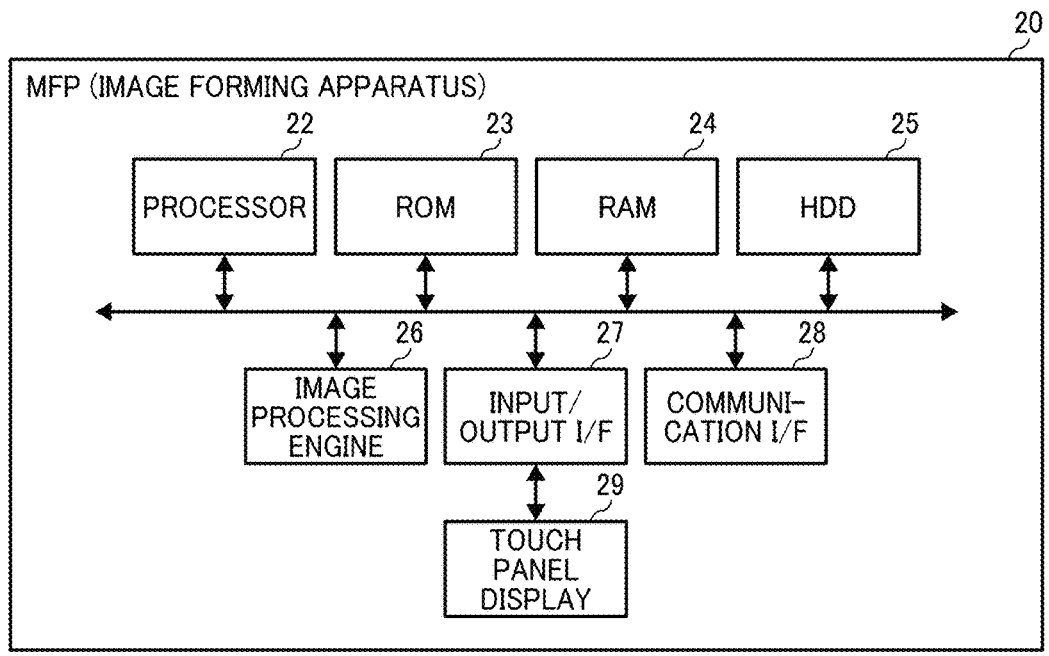
FIGS. 18A and 18B are diagrams illustrating a hardware configuration and functional blocks of an image forming apparatus as an embodiment of the present invention.
Figure 18B:
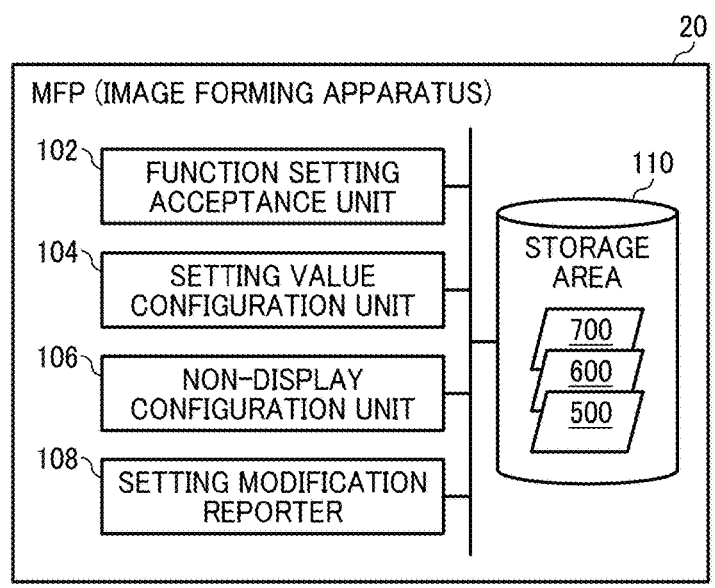

For example, in the embodiments described above, the operation apparatus 100 as an external apparatus is connected to the image forming apparatus 20. In other embodiments, the functional units described above included in the operational apparatus 100 may be implemented by executing a predetermined program stored in the ROM 23 by the processor 22 included in the image forming apparatus 20. FIG. 18A is a diagram illustrating a hardware configuration of the image forming apparatus 20 in that embodiment, and FIG. 18B is a diagram illustrating a functional configuration in that embodiment. In this case, a touch panel display 29 (a display embedded in the image forming apparatus 20) illustrated in FIG. 18A plays a role of the touch panel display 16 included in the operation apparatus 100 described above.

The functional units in that embodiment described above is applied not only to the image forming apparatus but also to general electronic apparatuses that implement selectable multiple functions.

The present invention also encompasses a non-transitory recording medium storing a program that executes an image forming method, performed by an image forming system, which includes an image forming apparatus and an operation apparatus communicably connected to the image forming apparatus including a display screen. The image forming method, performed by the image forming system, includes the steps of displaying on the display, in a predetermined display format, multiple display components corresponding to multiple setting items, the multiple setting items relating to one of a plurality of functions implemented in the image forming apparatus, the predetermined display format causing the display not to display at least a part of the multiple display components when the part of the multiple display components is configured as non-displayed, accepting a setting value for a first setting item of the multiple setting items through corresponding one of the multiple display components, determining whether a first setting item is one of a preregistered combination of setting items to be configured en bloc, modifying setting values for respective ones of the preregistered combination of setting items based on the accepted setting value for the first setting item, based on the determining indicating that a first setting item is one of a preregistered combination of setting items to be configured en bloc, determining whether any one of the multiple display components corresponding to the modified setting values for the preregistered combination of setting items is configured as non-displayed, and outputting a notification indicating that the setting value for the non-displayed setting item is modified, based on the determining indicating that any one of the multiple display components corresponding to the modified setting values is configured as non-displayed.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. Examples of a non-transitory recording medium storing processor-readable code include a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these. Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image forming apparatus, comprising:
   a display; and
   circuitry to:
   control the display to display, in a predetermined display format, multiple display components corresponding to multiple setting items, the multiple setting items relating to one of a plurality of functions implemented in the image forming apparatus, the predetermined display format causing the display not to display at least a first group of the multiple display components when the first group of the multiple display components is configured as non-displayed;
   modify setting values for respective ones of the multiple setting items based on setting values for a preregistered combination of setting items in response to selecting the preregistered combination of setting items by a user, the preregistered combination of setting items corresponding to a second group of the multiple display components to be configured en bloc; and
   output a notification to a user indicating that a setting value for a non-displayed setting item has been modified when one of the second group of display components corresponding to the setting values modified in response to selecting the preregistered combination of setting items by a user is also in the first group of the multiple display components that is configured as non-displayed.

2. The image forming apparatus according to claim 1, wherein the circuitry is further configured to
   control the display to display a setting screen including the multiple display components,
   control the display to display setting value information indicating the current setting value for a setting item on a display component corresponding to the setting item included in the multiple display components,
   accept a user operation for registering a combination of setting items via the setting screen, and
   register the combination of setting items as the preregistered combination of setting items based on the user operation and the current setting values indicated by the setting value information displayed on the display components corresponding to the setting items.

3. The image forming apparatus according to claim 1, wherein the circuitry is further configured to
   control the display to display a setting screen including the multiple display components,
   accept a user operation for selecting a combination of setting items via the setting screen,
   control the display to display a list of the preregistered combination of setting items based on the user operation, and
   accept selection of the preregistered combination of setting items from the list.

4. The image forming apparatus according to claim 1, wherein the circuitry is further configured to output the notification in a dialog indicating that the setting value of the non-displayed setting item has been modified.

5. The image forming apparatus according to claim 1, wherein the circuitry is further configured to output the notification, through temporarily displaying the display component corresponding to the non-displayed setting item whose setting value has been modified.

6. The image forming apparatus according to claim 1, wherein the circuitry is further configured to display the display component corresponding to the non-displayed setting item separately from a display component currently being displayed.

7. An image forming system, comprising:
   a display; and
   an image forming apparatus including circuitry to
   control the display to display, in a predetermined display format, multiple display components corresponding to multiple setting items, the multiple setting items relating to one of a plurality of functions implemented in the image forming apparatus, the predetermined display format causing the display not to display at least a first group of the multiple display components when the first group of the multiple display components is configured as non-displayed;
   modify setting values for respective ones of the multiple setting items based on setting values for a preregistered combination of setting items in response to selecting the preregistered combination of setting items by a user, the preregistered combination of setting items corresponding to a second group of the multiple display components to be configured en bloc; and
   output a notification to a user indicating that a setting value for a non-displayed setting item has been modified when one of the second group of display components corresponding to the setting values modified in response to selecting the preregistered combination of setting items by a user is also in the first group of the multiple display components that is configured as non-displayed.

8. The image forming system according to claim 7, wherein the circuitry is further configured to
control the display to display a setting screen including the multiple display components,
control the display to display setting value information indicating the current setting value for a setting item on a display component corresponding to the setting item included in the multiple display components,
accept a user operation for registering a combination of setting items via the setting screen, and
register the combination of setting items as the preregistered combination of setting items based on the user operation and the current setting values indicated by the setting value information displayed on the display components corresponding to the setting items.

9. The image forming system according to claim 7, wherein the circuitry is further configured to
control the display to display a setting screen including the multiple display components,
accept a user operation for selecting a combination of setting items via the setting screen,
control the display to display a list of the preregistered combination of setting items based on the user operation, and
accept selection of the preregistered combination of setting items from the list.

10. The image forming system according to claim 7, wherein the circuitry is further configured to output the notification in a dialog indicating that the setting value of the non-displayed setting item has been modified.

11. The image forming system according to claim 7, wherein the circuitry is further configured to output the notification, through temporarily displaying the display component corresponding to the non-displayed setting item whose setting value has been modified.

12. The image forming system according to claim 7, wherein the circuitry is further configured to display the display component corresponding to the non-displayed setting item separately from a display component currently being displayed.

13. An image forming method, comprising:
controlling a display to display, in a predetermined display format, multiple display components corresponding to multiple setting items, the multiple setting items relating to one of a plurality of functions implemented in an image forming apparatus, the predetermined display format causing the display not to display at least a first group of the multiple display components when the first group of the multiple display components is configured as non-displayed;
modifying setting values for respective ones of the multiple setting items based on setting values for a preregistered combination of setting items in response to selecting the preregistered combination of setting items by a user, the preregistered combination of setting items corresponding to a second group of the multiple display components to be configured en bloc; and
outputting a notification to a user indicating that a setting value for a non-displayed setting item has been modified when one of the second group of display components corresponding to the setting values modified in response to selecting the preregistered combination of setting items by a user is also in the first group of the multiple display components that is configured as non-displayed.

14. The image forming method according to claim 13, further comprising:
controlling the display to display a setting screen including the multiple display components,
controlling the display to display setting value information indicating the current setting value for a setting item on a display component corresponding to the setting item included in the multiple display components,
accepting a user operation for registering a combination of setting items via the setting screen, and
registering the combination of setting items as the preregistered combination of setting items based on the user operation and the current setting values indicated by the setting value information displayed on the display components corresponding to the setting items.

15. The image forming method according to claim 13, further comprising:
controlling the display to display a setting screen including the multiple display components,
accepting a user operation for selecting a combination of setting items via the setting screen,
controlling the display to display a list of the preregistered combination of setting items based on the user operation, and
accepting selection of the preregistered combination of setting items from the list.

16. The image forming method according to claim 13, wherein the outputting step comprises outputting the notification in a dialog indicating that the setting value of the non-displayed setting item has been modified.

17. The image forming method according to claim 13, wherein the outputting step comprises outputting the notification, through temporarily displaying the display component corresponding to the non-displayed setting item whose setting value has been modified.

18. The image forming method according to claim 13, further comprising:
displaying the display component corresponding to the non-displayed setting item separately from a display component currently being displayed.

* * * * *